United States Patent
Ishizaki

(10) Patent No.: US 7,011,914 B2
(45) Date of Patent: Mar. 14, 2006

(54) METHOD OF PRODUCING CIRCULAR POLARIZATION CONTROLLING OPTICAL ELEMENT

(75) Inventor: Koji Ishizaki, Shinjuku-Ku (JP)

(73) Assignee: Dai Nippon Printing Co., Ltd., Tokyo (JP)

( * ) Notice: Subject to any disclaimer, the term of this patent is extended or adjusted under 35 U.S.C. 154(b) by 223 days.

(21) Appl. No.: 10/466,074

(22) PCT Filed: Nov. 12, 2002

(86) PCT No.: PCT/JP02/11803

§ 371 (c)(1),
(2), (4) Date: Jul. 11, 2003

(87) PCT Pub. No.: WO03/042731

PCT Pub. Date: May 22, 2003

(65) Prior Publication Data

US 2004/0046926 A1    Mar. 11, 2004

(30) Foreign Application Priority Data

Nov. 12, 2001    (JP) .............................. 2001-346776

(51) Int. Cl.
G02B 5/30    (2006.01)
(52) U.S. Cl. ...................... 430/20; 430/321; 427/495; 427/508; 427/163.1
(58) Field of Classification Search ................ 430/20, 430/321, 7; 427/495, 508, 163.1
See application file for complete search history.

(56) References Cited

U.S. PATENT DOCUMENTS

| 5,691,789 A | 11/1997 | Li et al. ........................ 349/98 |
| 6,057,008 A * | 5/2000 | Schwalb et al. .............. 428/1.1 |
| 6,071,438 A * | 6/2000 | Leigeber et al. ............. 252/585 |
| 6,816,215 B1 * | 11/2004 | Umeya ......................... 349/98 |

FOREIGN PATENT DOCUMENTS

| JP | 61-115989 | 6/1986 |
| JP | 08-281814 | 10/1994 |

(Continued)

Primary Examiner—John A. McPherson
(74) Attorney, Agent, or Firm—Oliff & Berridge, PLC

(57) ABSTRACT

An active-radiation-curing liquid crystalline composition is applied to an alignment layer 2 formed on a base 1, and the liquid crystal alignment is regulated by the application of heat or the like, thereby forming a liquid crystal layer 3 having cholesteric regularity (FIG. 1(a)). Next, active radiation 4 with a predetermined radiant intensity is applied to the liquid crystal layer 3 through a photomask 10 (FIG. 1(b)), and this liquid crystal layer 3 is then brought into contact with a solvent 5 (FIG. 1(c)). As a result, the area 3b in the liquid crystal layer 3 not irradiated with the active radiation 4 is removed, while the area 3a in the liquid crystal layer 3 irradiated with the active radiation 4 remains; a semi-cured cholesteric layer 3' having therein a predetermined pattern is thus formed (FIG. 1(d)). Thereafter, active radiation 6 is applied to the surface of the semi-cured cholesteric layer 3' to form a curing rate gradient in the semi-cured cholesteric layer 3' between the substrate 9 side surface and the surface opposite to it and cure, while retaining this curing rate gradient, the semi-cured cholesteric layer 3' to broaden its selective reflection wave range (FIG. 1(e)). Lastly, the semi-cured cholesteric layer 3' is cured by the application of active radiation 8 while retaining the cholesteric regularity which the semi-cured cholesteric layer 3' has developed in the course of broadening of its selective reflection wave range, thereby obtaining a cured cholesteric layer 3'' (FIG. 1(f)).

24 Claims, 2 Drawing Sheets

FOREIGN PATENT DOCUMENTS

| | | |
|---|---|---|
| JP | 10-54905 | 2/1998 |
| JP | 10-319235 | 4/1998 |
| JP | 10-260387 | 9/1998 |
| JP | 10-316755 | 12/1998 |
| WO | WO 97/16762 | 5/1997 |
| WO | WO 00/34808 | 6/2000 |

* cited by examiner

METHOD OF PRODUCING CIRCULAR POLARIZATION CONTROLLING OPTICAL ELEMENT

TECHNICAL FIELD

The present invention relates to a method of producing a circular polarization controlling optical element useful for extracting right- or left-handed circularly polarized light from non-polarized light.

BACKGROUND ART

Optical elements including cholesteric layers having cholesteric regularity are extensively used as circular polarization controlling optical elements (circularly polarizing plates, color filters, etc.) for liquid crystal displays.

In order to obtain circularly polarizing plates capable of reflecting every visible light, or reflection-type color filters in which each pixel has different selective reflection wave ranges corresponding to red (R), green (G) and blue (B) colors, or optical elements that are used in transmission or semi-transmission liquid crystal displays to improve optical efficiency, it is necessary to broaden the selective reflection wave ranges of cholesteric layers, or vary the selective reflection wave ranges so that they respectively agree with the wave ranges of red, green and blue light. This necessity demands a method of controlling the selective reflection wage ranges of cholesteric layers (broadening or wavelength shift of the selective reflection wave ranges) with high accuracy and ease.

Heretofore, a method in which multiple cholesteric layers having selective reflection wave ranges centered at different wavelengths are laminated (Japanese Laid-Open Patent Publication No. 319235/1998) has been proposed as a method of obtaining a cholesteric layer having a broadened selective reflection wave range.

With this method, however, a broadened selective reflection wave range which is simply the sum of the selective reflection wave ranges of cholesteric layers laminated is obtained, and a continuous change in helical pitch can never be brought about in the laminate. It is therefore necessary to laminate a greater number of cholesteric layers to obtain a greatly broadened selective reflection wave range, and this makes the method less efficient. Further, cholesteric layers to be laminated have different refractive indexes, so that the loss of light reflection is caused at the interface between each two cholesteric layers laminated. Furthermore, since a number of cholesteric layers are laminated, it is not easy to make the resulting laminate thin. In addition, since this method requires a great number of steps to accomplish a full-color display, it has several disadvantages from the viewpoint of production efficiency and cost.

Another known method of obtaining a cholesteric layer having a broadened selective reflection wave range is that a liquid crystalline material capable of developing cholesteric structure with continuously varied helical pitches is used to form a cholesteric layer (U.S. Pat. No. 5,691,789, and Japanese Laid-Open Patent Publication No. 281814/1994).

This method does not require the lamination of multiple cholesteric layers, so that it can solve many of the aforementioned problems. However, the method is at a disadvantage in that since non-crosslinkable liquid crystalline molecules are used as the liquid crystalline material, the resulting cholesteric layer is poor in resistance to heat, and patterning, which is essential to accomplish a full-color display, cannot be conducted on such a cholesteric layer.

A further known method of obtaining a cholesteric layer having a broadened selective reflection wave range is that a liquid crystal having cholesteric regularity is brought into contact with a solvent or solvent mixture (Japanese Laid-Open Patent Publication No. 316755/1998).

However, the cholesteric layer obtained by this method has lowered color purity, so that a liquid crystal display in which such a cholesteric layer is incorporated cannot clearly display an image.

On the other hand, a method in which optically active groups constituting cholesteric structure are modified or deactivated (Japanese Laid-Open Patent Publication No. 54905/1998) has been proposed as a method of varying the selective reflection wave ranges of cholesteric layers so that they respectively agree with the wave ranges of light of various colors.

In this method, optically active groups are either modified or deactivated, so that the modified or deactivated molecules are to exist as impurities to impair the stability of the cholesteric layers. This method thus has the problem that a liquid crystal display containing these cholesteric layers cannot clearly display an image.

DISCLOSURE OF THE INVENTION

The present invention was accomplished in the light of the aforementioned drawbacks in the prior art. An object of the present invention is therefore to provide a method of producing a circular polarization controlling optical element, with which it is possible to easily control, within a proper range, the selective reflection wave range of a cholesteric layer (broadening or wavelength shift of the selective reflection wave range) without impairing the excellent optical properties which the cholesteric layer originally has.

The present invention provides, as a first aspect for attaining the above object, a method of producing a circular polarization controlling optical element, the method comprising: the liquid-crystal-layer-forming step of forming, on a substrate having aligning power, an active-radiation-curing liquid crystal layer having cholesteric regularity, the liquid crystal layer containing a polymerizable chiral agent and a polymerizable liquid crystalline material capable of developing nematic regularity; the semi-cured-cholesteric-layer-forming step of forming a semi-cured cholesteric layer by applying active radiation with a predetermined radiant intensity to the liquid crystal layer; and the wave-range-broadening step of broadening a selective reflection wave range of the semi-cured cholesteric layer by curing the semi-cured cholesteric layer with a curing rate gradient being formed in the semi-cured cholesteric layer between the substrate-side surface and the surface opposite to it.

According to the first aspect for attaining the object of the present invention, the selective reflection wave range of the semi-cured cholesteric layer is broadened by curing the semi-cured cholesteric layer while retaining the curing rate gradient formed in the semi-cured cholesteric layer between the substrate-side surface and the surface opposite to it. It is therefore possible to accomplish the broadening of the selective reflection wave range using a single crystal layer without laminating a large number of liquid crystal layers. Since the number of optical interfaces is thus made small, it is possible to prevent deterioration of optical properties that is brought about by the interfacial reflection of light. Further, it is not necessary to use, as the liquid crystalline material, non-crosslinkable liquid crystalline molecules or the like, and the structure composed of the liquid crystalline molecules can be fully fixed by the application of active radiation such as ultraviolet light. The liquid crystal layer finally obtained, therefore, has resistance to heat and firmly fixed optical properties, so that they do not undergo any change even when it is heated later. Moreover, since it is not necessary to conduct thermocompression bonding or the like, which is usually conducted at high temperatures to laminate multiple liquid crystal layers, heat resistance is not required for the materials to be used. Therefore, the materials can be selected from wider ranges.

Further, according to the first aspect, after forming the semi-cured cholesteric layer by applying active radiation to the liquid crystal layer having cholesteric regularity, its selective reflection wave range is broadened. It is therefore possible to accomplish, within desired limits, the broadening of the selective reflection wave range and prevent excessive broadening of the selective reflection wave range.

In the above-described first aspect for attaining the object of the invention, it is preferable that the method of producing a circular polarization controlling optical element further comprises the cured-cholesteric-layer-forming step of forming a cured cholesteric layer by curing the semi-cured cholesteric layer having the broadened selective reflection wave range by the application of active radiation, heat or the like. In this step is cured while retaining the cholesteric regularity which the semi-cured cholesteric layer has developed in the course of broadening of its selective reflection wave range, so that a stabilized cholesteric layer can be obtained.

Further, in the above-described first aspect for attaining the object of the invention, it is preferable that the semi-cured cholesteric layer formed in the semi-cured-cholesteric-layer-forming step be in such a state that functional groups in an amount of 10 to 80 mol % of the total functional groups contained in the polymerizable chiral agent and the polymerizable liquid crystalline material capable of developing nematic regularity have been polymerized. This is because if the curing of the cholesteric layer proceeds over this range, it may become difficult to broaden the selective reflection wave range, while if the degree of cure of the cholesteric layer is lower than the above-described range, it is highly possible that the cholesteric layer is damaged when brought into contact with a solvent or the like in the subsequent step.

Furthermore, in the aforementioned first aspect for attaining the object of the invention, it is preferable that the substrate, on which the liquid crystal layer is formed in the liquid-crystal-layer-forming step, includes a base having aligning power on its surface. This is because if the base itself has aligning power at least on its surface, it is not necessary to further provide another layer having aligning power; the production efficiency is thus increased. Alternatively, the substrate, on which the liquid crystal layer is formed in the liquid-crystal-layer-forming step, may include a base and an alignment layer formed on the base and having aligning power. This is because if a liquid is formed on the alignment layer provided on the base, it is possible to control the liquid crystal alignment more efficiently with high accuracy, so that the liquid crystal layer can develop cholesteric regularity more distinctly.

Furthermore, in the above-described first aspect for attaining the object of the present invention, it is preferable that the semi-cured-cholesteric-layer-forming step comprises: the step of applying pattern-wise, to the liquid crystal layer formed on the substrate, active radiation with a predetermined radiant intensity so as to form, in the liquid crystal layer, a semi-cured area in a predetermined pattern; and the step of developing the liquid crystal layer in which the semi-cured area has been formed in the predetermined pattern, thereby obtaining a semi-cured cholesteric layer having the predetermined pattern. If such a photolithographic technique is used for patterning, it becomes possible to form patterns of, for example, red (R), green (G) and blue (B) colors in the semi-cured cholesteric layer and accomplish, in the subsequent wave-range-broadening step, the broadening of the selective reflection wave range to meet the requirements of the respective colors.

Furthermore, in the above-described first aspect for attaining the object of the invention, it is preferable that the semi-cured-cholesteric-layer-forming step comprises the step of applying pattern-wise, to the liquid crystal layer formed on the substrate, active radiation with different radiant intensities so as to form, in the liquid crystal layer, semi-cured areas in a plurality of patterns with different degrees of cure; and the step of bringing the liquid crystal layer having therein the semi-cured areas in a plurality of patterns with different degrees of cure into contact with a solvent that can selectively dissolve away the uncured components of the liquid crystal layer, that is, the polymerizable chiral agent and the polymerizable liquid crystalline material capable of developing nematic regularity, thereby obtaining a semi-cured cholesteric layer having a plurality of patterns of different selective reflection colors. By thus bringing the liquid crystal layer into contact with the solvent after forming, in the liquid crystal layer, the semi-cured areas in a plurality of patterns with different degrees of cure, it becomes possible to form, at one time, a semi-cured cholesteric layer having patterns corresponding to red (R), green (G) and blue (B) colors, for example. The reason for this is as follows: the solvent that is brought into contact with the liquid crystal layer selectively dissolves away the uncured components (the polymerizable chiral agent and the polymerizable liquid crystalline material capable of developing nematic regularity) of each semi-cured area formed in the liquid crystal layer, so that the ratio of the polymerizable chiral agent to the polymerizable liquid crystalline material in the semi-cured area varies according to the degree of cure of the semi-cured area; as a result, the central wavelength of the selective reflection wave range of the semi-cured area is shifted to form patterns corresponding to red (R), green (G) and blue (B). It thus becomes possible to form patterns corresponding to red (R), green (G) and blue (B) in the semi-cured cholesteric layer by simply bringing the liquid crystal layer into contact with the solvent, and the selective reflection wave ranges of all the patterns can be broadened simultaneously in the subsequent wave-range-broadening step. It is noted that it is also possible to broaden the selective reflection wave range for only one color or those for two colors by the use of a photomask. The expression "selectively dissolves away" herein means that the solvent dissolves away one of the components of the liquid crystalline material, that is, the chiral agent or the polymerizable liquid crystalline material capable of developing nematic regularity, more greatly than the other.

In the above-described first aspect for attaining the object of the present invention, it is preferable to adopt, as a first embodiment of the wave-range-broadening technique, a technique in which an oxygen-dependent polymerization initiator is made to exist in the semi-cured cholesteric layer and active radiation with a radiant intensity lower than that of active radiation to be used in the cured-cholesteric-layer-forming step is applied to the semi-cured cholesteric layer with its one surface exposed to an atmosphere of oxygen that acts to hinder the curing of the semi-cured cholesteric layer. If only one surface of the semi-cured cholesteric layer is selectively exposed to an atmosphere of oxygen that acts to hinder the curing of the semi-cured cholesteric layer, a curing rate gradient occurs in the semi-cured cholesteric layer between the substrate-side surface and the surface opposite to it. Variation in curing rate leads to change in helical pitch in the semi-cured cholesteric layer between the substrate-side surface and the surface opposite to it. Since the selective reflection wave range can be expressed as a function of helical pitch, it varies with helical pitch. It is therefore possible to broaden the selective reflection wave range of the semi-cured cholesteric layer by exposing only one surface of the semi-cured cholesteric layer to an atmosphere of oxygen.

In the above-described wave-range-broadening technique of the first embodiment, it is preferable that the active radiation to be used in the wave-range-broadening step be ultraviolet light and that the oxygen-dependent polymerization initiator be a photopolymerization initiator.

The reason for this is as follows: if ultraviolet light is used as the active radiation and a photopolymerization initiator, as the oxygen-dependent polymerization initiator, the photopolymerization initiator is excited when ultraviolet light is applied to the semi-cured cholesteric layer, so that it is possible to efficiently conduct the above-described wave-range-broadening treatment by utilizing the excitation energy.

Further, in the above-described wave-range-broadening technique of the first embodiment, it is preferable that the atmosphere of oxygen to be used in the wave-range-broadening step contains 10% or more of oxygen. This is because the effect of hindering the curing of the semi-cured cholesteric layer can be satisfactorily obtained as long as the oxygen content of the atmosphere is 10% or more. Such an atmosphere of oxygen is preferably that of air. This is because no extra equipment or the like is needed if an atmosphere of air is used, so that it is easy to operate the production system. The use of an atmosphere of air is thus advantageous from the viewpoint of production efficiency and cost.

In the wave-range-broadening step in the aforementioned first aspect for attaining the object of the present invention, it is preferable to employ, as a second embodiment of the wave-range-broadening technique, a technique in which weak active radiation with a radiant intensity of 0.1 to 10% of that of active radiation to be used in the cured-cholesteric-layer-forming step is applied only to one surface of the semi-cured cholesteric layer. Active radiation has the function of promoting curing of the semi-cured cholesteric layer, so that if active radiation with a radiant intensity in the above-described range is applied only to one surface of the semi-cured cholesteric layer, a curing rate gradient occurs in the semi-cured cholesteric layer between its two surfaces. As a result, the helical pitch varies between the two surfaces of the semi-cured cholesteric layer, and the selective reflection wage range of the semi-cured cholesteric layer is thus broadened.

In the above-described wave-range-broadening technique of the second embodiment, it is preferable that the application of weak active radiation in the wave-range-broadening step be conducted in an oxygen-free atmosphere. Oxygen acts to hinder the curing of the semi-cured cholesteric layer, and, on the other hand, curing of the semi-cured cholesteric layer is promoted in the absence of oxygen. Therefore, if the surface of the semi-cured cholesteric layer to be irradiated with the active radiation is exposed to an oxygen-free atmosphere, the curing-promoting effect of the active radiation is enhanced.

In the above case, it is preferable that the active radiation to be used in the wave-range-broadening step be ultraviolet light and that the semi-cured cholesteric layer contains a photopolymerization initiator. The reason for this is as follows: if ultraviolet light is used as the active radiation and the semi-cured cholesteric layer contains a photopolymerization initiator, the photopolymerization initiator is excited when ultraviolet light is applied to the semi-cured cholesteric layer; it is therefore possible to efficiently conduct the above-described wave-range-broadening treatment by utilizing the excitation energy.

Further, in the above-described wave-range-broadening technique of the second embodiment, it is preferable that the semi-cured cholesteric layer contains an oxygen-dependent photopolymerization initiator and that the application of weak active radiation in the wave-range-broadening step be conducted while exposing, to an atmosphere of oxygen, only the surface of the semi-cured cholesteric layer opposite to the surface to be irradiated with the weak active radiation.

When an oxygen-dependent polymerization initiator is used, oxygen and active radiation show reverse effects on curing rate. Owing to such effects, a great curing rate gradient occurs in the semi-cured cholesteric layer in the direction intersecting its two surfaces when only the surface of the semi-cured cholesteric layer opposite to the surface to be irradiated with the weak active radiation is exposed to an atmosphere of oxygen, and a change in helical pitch thus increases favorably. It is therefore possible to greatly broaden the selective reflection wave range of the semi-cured cholesteric layer.

In the above case, it is preferable that the active radiation to be used in the wave-range-broadening step be ultraviolet light and that the oxygen-dependent polymerization initiator be a photopolymerization initiator. The reason for this is as follows: if ultraviolet light and a photopolymerization initiator are used as the active radiation and the oxygen-dependent polymerization initiator, respectively, the photopolymerization initiator is excited when ultraviolet light is applied to the semi-cured cholesteric layer; it is therefore possible to efficiently conduct the above-described wave-range-broadening treatment by utilizing the excitation energy.

In the case where the wave-range-broadening step is effected in an atmosphere of oxygen by the application of weak active radiation, it is preferable that the polymerization initiator to be used in the above-described wave-range-broadening technique of the second embodiment has oxygen dependency lower than that of the polymerization initiator to be used in the previously-mentioned wave-range-broadening technique of the first embodiment. The reason for this is as follows: in the wave-range-broadening step that is effected by using weak active radiation, the active radiation is major cause for broadening of the selective reflection wave range, so that it is desirable to suppress, as much as possible, the curing-preventing effect of oxygen contained in the atmosphere to enhance the curing-promoting effect of the active radiation.

In the aforementioned first aspect for attaining the object of the present invention, it is preferable to cure, in the wave-range-broadening step, the semi-cured cholesteric layer with the semi-cured cholesteric layer being heated. If the semi-cured cholesteric layer is heated, its uncured components are readily fluidized, so that a gradient of the composition of the liquid crystalline composition readily occurs along with the formation of a curing rate gradient. It is therefore possible to conduct the above-described wave-range-broadening treatment with high efficiency.

Furthermore, in the above-described first aspect for attaining the object of the present invention, if the liquid-crystal-layer-forming step, the semi-cured-cholesteric-layer-forming step, the wave-range-broadening step and the cured-cholesteric-layer-forming step are repeatedly conducted after forming the first cured cholesteric layer, it becomes possible to provide a method of producing a circular polarization controlling optical element containing two or more cured cholesteric layers, wherein in the liquid-crystal-layer-forming step for the second or later liquid crystal layer, an alignment layer is formed on the cured cholesteric layer that has already been formed, and on this alignment layer is formed an active-radiation-curing liquid crystal layer having cholesteric regularity, which contains a polymerizable chiral agent and a polymerizable liquid crystalline material capable of developing nematic regularity. Further, if the liquid-crystal-layer-forming step, the semi-cured-cholesteric-layer-forming step, the wave-range-broadening step and the cured-cholesteric-layer-forming step are repeatedly conducted after forming the cured cholesteric layer, there can be obtained a method of producing a circular polarization controlling optical element containing two or more cured cholesteric layers, wherein in the liquid-crystal-layer-forming step for the second or later liquid crystal layer, an active-radiation-curing liquid crystal layer having cholesteric regularity, which contains a polymerizable chiral agent and a polymerizable liquid crystalline material capable of developing nematic regularity, is formed directly on the cured cholesteric layer that has already been formed. With these methods, it is possible to form a plurality of cholesteric layers having broadened selective reflection wave ranges, so that it becomes possible to produce a color filter in which cholesteric layers of multiple selective reflection colors are arranged or laminated. Moreover, it is also possible to further broaden the selective reflection wave range by laminating cholesteric layers having selective reflection wave ranges whose central wavelengths are slightly different from each other within a given range.

The present invention provides, as a second aspect for attaining the object of the invention, a method of producing a circular polarization controlling optical element, comprising the liquid-crystal-layer-forming step of forming, on a substrate having aligning power, an active-radiation-curing liquid crystal layer having cholesteric regularity, the liquid crystal layer containing a chiral agent and a polymerizable liquid crystalline material capable of developing nematic regularity; the semi-cured-area-forming step of forming a semi-cured area in the liquid crystal layer by applying active radiation with a predetermined radiant intensity to the liquid crystal layer; and the semi-cured-cholesteric-layer-forming step of bringing the liquid crystal layer having therein the semi-cured area into contact with a solvent that can selectively dissolve away the uncured components of the liquid crystal layer, that is, the chiral agent and the polymerizable liquid crystalline material capable of developing nematic regularity, thereby obtaining a semi-cured cholesteric layer of a predetermined selective reflection color.

According to the second aspect for attaining the object of the present invention, after forming a semi-cured area by applying, to the liquid crystal layer, active radiation with a predetermined radiant intensity, the liquid crystal layer having the semi-cured area is brought into contact with the solvent. It is therefore possible to control the selective reflection wave range (wavelength shift) of the semi-cured area with high accuracy and ease. The reason for this is as follows: since the solvent that is brought into contact with the liquid crystal layer selectively dissolves away the uncured components (the chiral agent and the polymerizable liquid crystalline material capable of developing nematic regularity) of the semi-cured area formed in the liquid crystal layer, the ratio of the chiral agent to the polymerizable liquid crystalline material in the semi-cured area varies according to the degree of cure of the semi-cured area, and the central wavelength of the selective reflection wave range of the semi-cured area is thus shifted.

In the above-described second aspect for attaining the object of the invention, it is preferable that the method of producing a circular polarization controlling optical element further comprises the cured-cholesteric-layer-forming step of forming a cured cholesteric layer by curing the semi-cured cholesteric layer by the application of active radiation, heat, or the like. With this step, the semi-cured cholesteric layer is cured while retaining the cholesteric regularity which the semi-cured cholesteric layer has developed in the course of broadening of its selective reflection wave range, so that a stabilized cholesteric layer can be obtained.

Further, in the aforementioned second aspect for attaining the object of the invention, it is preferable that, in the semi-cured-area-forming step, active radiation with different radiant intensities is applied pattern-wise to the liquid crystal layer to form therein semi-cured areas in a plurality of patterns with different degrees of cure, and that, in the semi-cured-cholesteric-layer-forming step, the liquid crystal layer having therein the semi-cured areas in a plurality of patterns with different degrees of cure is brought into contact with a solvent that can selectively dissolve away the uncured components of the liquid crystal layer, that is, the chiral agent and the polymerizable liquid crystalline material capable of developing nematic regularity, thereby obtaining a semi-cured cholesteric layer having a plurality of patterns of different selective reflection colors. Thus, by bringing the liquid crystal layer into contact with the solvent after forming, in the liquid crystal layer, the semi-cured areas in a plurality of patterns with different degrees of cure, it becomes possible, on the above-described principle, to obtain at one time a semi-cured cholesteric layer having patterns corresponding to red (R), green (G) and blue (B), for example.

Furthermore, in the above-described second aspect for attaining the object of the invention, it is preferable that the substrate, on which the liquid crystal layer is formed in the liquid-crystal-layer-forming step, includes a base having aligning power on its surface. This is because if a base itself having aligning power at least on its surface is used, it is not necessary to further provide a layer having aligning power, so that the production efficiency is improved. Alternatively, the substrate, on which the liquid crystal layer is formed in the liquid-crystal-layer-forming step, may include a base and an alignment layer formed on the base and having aligning power. This is because if a liquid crystal layer is formed on the alignment layer provided on the base, the liquid crystal alignment can be controlled more efficiently with high accuracy, so that the liquid crystal layer can develop cholesteric regularity more distinctly.

EMBODIMENTS OF THE INVENTION

By referring to the accompanying drawings, embodiments of the present invention will be described hereinafter in detail.

[A. First Embodiment]

Figure 1:
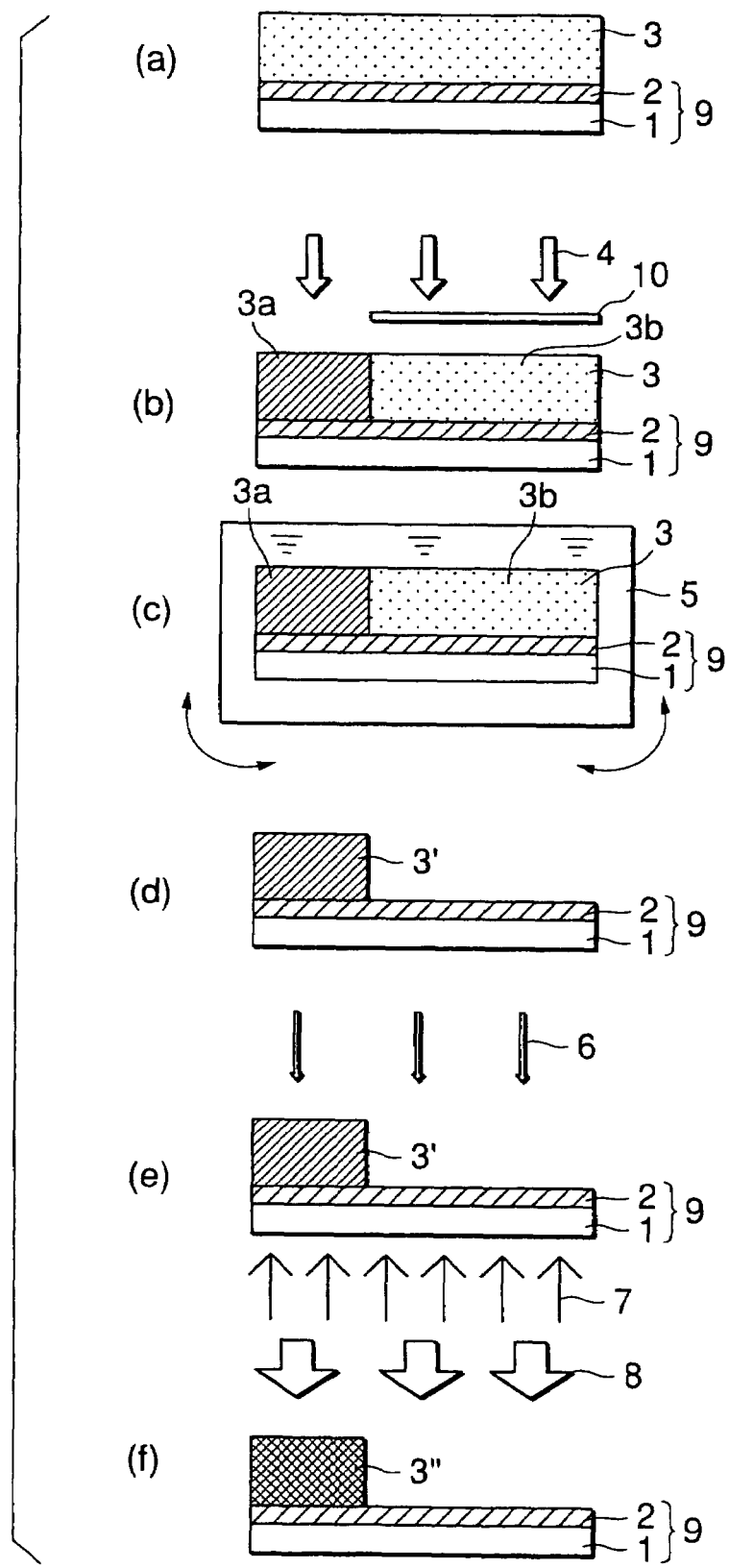
FIG. 1 is a flow chart for illustrating the method of producing a circular polarization controlling optical element according to the first embodiment of the present invention.

A method of producing a circular polarization controlling optical element according to the first embodiment of the present invention is firstly described by referring to FIG. 1. The first embodiment of the present invention is that a semi-cured cholesteric layer is photolithographically patterned.

As shown in FIG. 1(a), an active-radiation-curing liquid crystalline composition is applied to an alignment layer 2 formed on a base 1, and the liquid crystal alignment is regulated by the application of heat or the like, thereby forming a liquid crystal layer 3 having cholesteric regularity (the step of forming a liquid crystal layer). The alignment layer 2 is a layer formed on the base 1 by coating, and having aligning power imparted by rubbing treatment. The base 1 and the alignment layer 2 constitute a substrate 9 having aligning power.

Next, as shown in FIGS. 1(b), 1(c) and 1(d), active radiation 4 with a predetermined radiant intensity is applied through a photomask 10 to the liquid crystal layer 3 formed on the substrate 9 having aligning power, and this liquid crystal layer 3 is then brought into contact with a solvent 5. As a result, the area 3b in the liquid crystal layer 3 not irradiated with the active radiation 4 is removed, while the area 3a in the liquid crystal layer 3 irradiated with the active radiation 4 remains. A semi-cured cholesteric layer 3' having therein a predetermined pattern (pattern equivalent to the area 3a) is thus obtained (the step of forming a semi-cured cholesteric layer). In order to obtain the cholesteric layer 3' in the semi-cured state, the radiant intensity of the active radiation 4 to be applied to the liquid crystal layer 3 is controlled so that it is lower than that of the active radiation with which the liquid crystal layer 3 is fully cured.

Thereafter, as shown in FIG. 1(e), while heating (see reference numeral 7) one surface (the substrate 9 side surface) of the semi-cured cholesteric layer 3', active radiation 6 is applied to the other surface to form a curing rate gradient in the semi-cured cholesteric layer 3' between the substrate 9 side surface and the surface opposite to it and cure, while retaining this curing rate gradient, the semi-cured cholesteric layer 3' to broaden its selective reflection wave range (the wave-range-broadening step). Techniques that can be used herein to broaden the selective reflection wave range of the semi-cured cholesteric layer 3' include one using oxygen and one using weak active radiation; the details of these techniques will be presented later.

Lastly, as shown in FIG. 1(f), the semi-cured cholesteric layer 3' having the broadened selective reflection wave range is cured by applying active radiation 8 while retaining the cholesteric regularity which the semi-cured cholesteric layer 3' has developed in the course of broadening of its selective reflection wave range, thereby obtaining a cured cholesteric layer 3'' (the step of forming a cured cholesteric layer). The radiant intensity of the active radiation 8 to be applied to the semi-cured cholesteric layer 3' is made high enough to fully cure the semi-cured cholesteric layer 3'.

Through a series of the above-described steps, there can be produced a circular polarization controlling optical element comprising the cured cholesteric layer 3'' in a predetermined pattern.

Each step of the above-described method of producing a circular polarization controlling optical element according to the first embodiment of the present invention will now be described in detail.

(1. Step of Forming Liquid Crystal Layer)

In the step of forming a liquid crystal layer, a liquid crystal layer 3 is formed on a substrate 9 having aligning power, as shown in FIG. 1(a).

The liquid crystal layer 3 is formed by applying a liquid crystalline composition to the substrate 9 having aligning power, and any technique can be employed for this purpose.

For example, the liquid crystal layer 3 may be formed by casting, where a liquid crystalline composition dissolved in a proper solvent is cast upon the substrate 9 having aligning power, or by laminating, where a coating film of a liquid crystalline composition is dried and the dried film is laminated to the substrate 9. Another technique useful herein is that the substrate 9 is coated with a coating liquid prepared by dissolving a liquid crystalline composition in a proper solvent. Coating methods that can be used in this technique include spin coating, roll coating, printing, dip coating, and curtain coating (die coating).

Useful for the substrate 9 having aligning power is not only a base 1 on which an alignment layer 2 has been formed, as shown in FIG. 1(a), but also a base having aligning power on its surface (e.g., an oriented film, etc.).

The details of the liquid crystal layer 3 and those of the substrate 9 having aligning power will be given below.

(1.1. Liquid Crystal Layer)

The liquid crystalline composition that is used for forming the liquid crystal layer 3 comprises a polymerizable liquid crystalline material capable of developing nematic regularity and a polymerizable chiral agent. The polymerizable chiral agent is for controlling the helical pitch in the polymerizable liquid crystal line material capable of developing nematic regularity so that the liquid crystalline composition can develop cholesteric regularity as a whole. The liquid crystalline composition further comprises a polymerization initiator that acts in the wave-range-broadening step, which will be described later, and other proper additives. The "liquid crystal layer" herein refers to a layer capable of developing a liquid crystalline phase depending upon temperature.

The components of the liquid crystal layer 3 will be described below.

(1.1.1. Polymerizable Liquid Crystalline Material Capable of Developing Nematic Regularity)

Any compound can be used as the polymerizable liquid crystalline material capable of developing nematic regularity, one component of the liquid crystalline composition, as long as it is a liquid crystalline material having a plurality of polymerizable functional groups that are polymerized by active radiation. Examples of such liquid crystalline materials include the following compounds.

Namely, there can be mentioned compounds (I) and (II) having the general formulas (1) and (2), respectively, shown below. These two compounds can be used either singly or in combination.

For the compound (I), one of those compounds represented by the general formula (1), or a mixture of two or more of these compounds can be used, and for the compound (II), one of those compounds represented by the general formula (2), or a mixture of two or more of these compounds can be used.

General Formula (1):

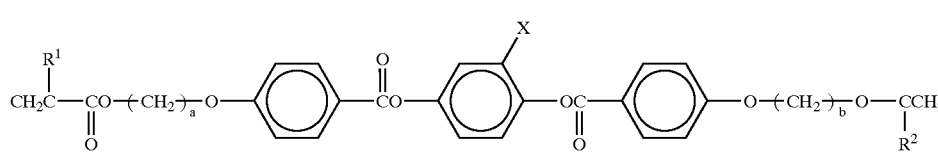

In the above general formula (1) showing the compound (I), $R^1$ and $R^2$ independently represent hydrogen or methyl group, but it is preferable that both $R^1$ and $R^2$ be hydrogen if the temperature range in which the compound (I) can develop a liquid crystalline phase is taken into consideration. X may be any of hydrogen, chlorine, bromine, iodine, an alkyl group having 1 to 4 carbon atoms, methoxy group, cyano group and nitro group, and either chlorine or methyl group is preferred. a and b that respectively show the chain lengths of the alkylene groups existing as spacers between the (meth)acryloyloxy groups, the end groups of the molecular chain of the compound (I), and the aromatic ring are independently an integer between 2 and 12, preferably between 4 and 10, more preferably between 6 and 9. Those compounds having the general formula (1) in which both a and b are equal to 0 are poor in stability, readily undergo hydrolysis, and have high crystallinity, while those compounds having the general formula (1) in which a and b are respectively 13 or more have low isotropic transition temperatures (TI's). These compounds therefore develop liquid crystallinity at temperatures in narrow ranges, so that they are unfavorable. General formula (2):

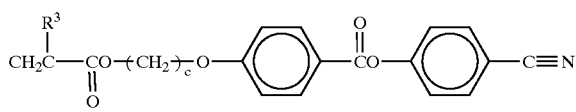

In the above general formula (2) showing the compound (II), $R^3$ represents hydrogen or methyl group, but hydrogen is preferred if the temperature range in which the compound (II) develops a liquid crystalline phase is taken into consideration. As for c showing the chain length of the alkylene group, those compounds (II) in which c is a number between 2 and 12 do not have liquid crystallinity. However, if the compatibility with the compound (I) having liquid crystallinity is taken into consideration, c is preferably a number between 4 and 10, more preferably between 6 and 9. The compound (II) can be synthesized through any process. For example, the compound (II) may be synthesized by the esterification reaction between 1 equivalent of 4-cyanophenol and 1 equivalent of 4-(n-(meth)acryloyl-oxyalkoxy) benzoic acid. Generally, in this esterification reaction, the above benzoic acid is activated by an acid chloride, sulfonic anhydride, or the like, and is then reacted with 4-cyanophenol, as in the synthesis of the compound (I). Alternatively, the above benzoic acid may be reacted with 4-cyanophenol with the aid of a condensation agent such as DCC (dicyclohexylcarbodiimide).

In the liquid crystalline composition according to the first embodiment of the present invention, the relative amounts of the compounds (I) and (II) are optimally determined, considering the molecular length of each compound to be used, the properties of the circularly polarization controlling optical element to be finally obtained, and so forth. However, the weight ratio of the compound (I) to the compound (II) is generally from 99:1 to 50:50, preferably from 95:5 to 60:40, more preferably from 90:10 to 65:35, most preferably from 85:15 to 70:30. In the case where the amount of the compound (I) contained in the liquid crystalline composition is in excess of 99% by weight of the total amount of the compounds (I) and (II), a liquid crystal layer made from this liquid crystalline composition cannot develop sufficiently high liquid crystallinity because the compound (II) has relatively high crystallinity. On the other hand, when the amount of the compound (I) contained in the liquid crystalline composition is less than 50% by weight of the total amount of the compounds (I) and (II), the liquid crystalline composition has a lowered isotropic transition temperature (TI), so that the temperature range in which the composition develops a liquid crystalline phase is extremely narrow.

(1.1.2. Chiral Agent)

Any chiral agent can be used in the liquid crystalline composition as long as it can cause the desired helical alignment of molecules in the above-described polymerizable liquid crystalline material capable of developing nematic regularity without impairing its liquid crystallinity. A chiral agent that is used to cause liquid crystalline molecules to align in helical fashion is required to have any type of chirality at least in its molecule. Examples of chiral agents herein useful includes those compounds having one, or two or more asymmetric carbon atoms, those compounds having asymmetric points on hetero atoms, such as chiral amines or sulfoxides, and those compounds containing axially asymmetric, optically active sites, having low molecular weights of not more than 1500, such as cumulene and binaphthol. Specific examples of these chiral agents include commercially available chiral nematic liquid crystals such as Chiral Dopant Liquid Crystal S-811 manufactured by Merck KGaA, German.

In the first embodiment of the present invention, the step of forming a semi-cured cholesteric layer, which will be described later, is effected photolithographically. Therefore, to produce a full-color, circular polarization controlling optical element, it is necessary to prepare liquid crystalline compositions corresponding to red (R), green (G) and blue (B) colors beforehand. Namely, since a liquid crystalline composition for red (R) is needed to have a long helical pitch, the chiral agent is added to the composition so that the ratio of the above-described polymerizable liquid crystalline material capable of developing nematic regularity to the chiral agent is 98:2, for example. A liquid crystalline composition for green (G) is needed to have a helical pitch shorter than that of the liquid crystalline composition for red (R), so that the polymerizable liquid crystalline material capable of developing nematic regularity and the chiral agent are mixed at a ratio of 96:4, for example. Lastly, a liquid crystalline composition for blue (B) is needed to have a helical pitch shorter than those of the liquid crystalline compositions for red (R) and green (G), so that the polymerizable liquid crystalline material capable of developing nematic regularity and the chiral agent are mixed at a ratio of 94:6, for example. The "chiral pitch" herein refers to the distance which it takes for liquid crystalline molecules to rotate through 360°.

Thus, it is possible to obtain different selective reflection colors by changing the mixing ratio of the polymerizable liquid crystalline material capable of developing nematic regularity to the chiral agent. The reason for this is as follows.

If the central wavelength of a selective reflection wave range, at which the scattering of rotated light is maximum, is given by $\lambda_o$, this $\lambda_o$ can be shown by the following equation:

$$\lambda_o = n \cdot p$$

wherein $\underline{n}$ is the mean refractive index on a plane perpendicular to the helical axis, and $\underline{p}$ is the helical pitch.

Namely, as is clear from the above equation, the central wavelength $\lambda_o$ of a selective reflection wave range is a function of helical pitch $\underline{p}$. Therefore, by varying the helical pitch $\underline{p}$ by changing the mixing ratio of the polymerizable liquid crystalline material capable of developing nematic regularity to the chiral agent, it is possible to shift the central wavelength $\lambda_o$ of the selective reflection wave range. There can thus be obtained liquid crystal layers of different selective reflection colors.

However, depending upon the nature of the chiral agent selected, such problems may occur that the nematic regularity developed by the above compounds (I) and (II) is broken, and that liquid crystalline molecules are not aligned well. Further, in the case where the chiral agent is non-polymerizable, there are the possibilities that the liquid crystalline composition has impaired curing characteristics and that the cured film has lowered reliability. Furthermore, the use of a great amount of a chiral agent having optically active sites increases the cost of the liquid crystalline composition. Therefore, to form a cholesteric layer having cholesteric regularity with a short helical pitch, it is preferable to select, as the chiral agent having optically active sites to be incorporated into the liquid crystalline composition, a chiral agent whose effect of causing liquid crystalline molecules to align in helical fashion is great. Specifically, it is preferable to use, as such a chiral agent, a low-molecular-weight compound (III) having an asymmetric axis in its molecule, such as a compound represented by the following general formula (3) or (4):

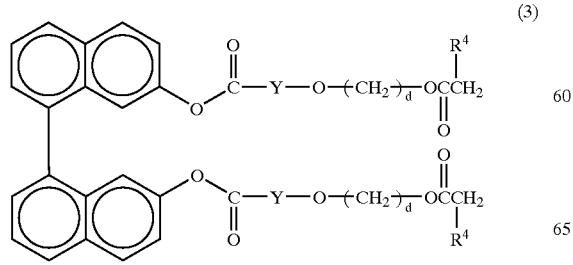
(3)

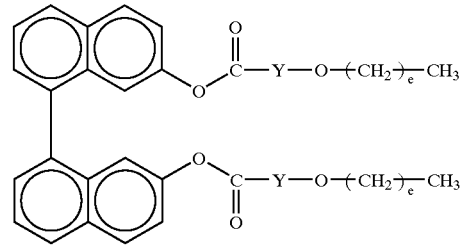
(4)

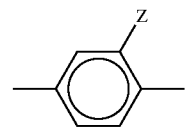
(i)

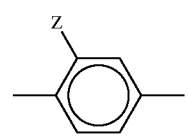
(ii)

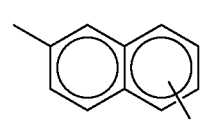
(iii)

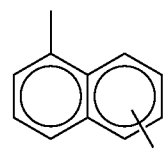
(iv)

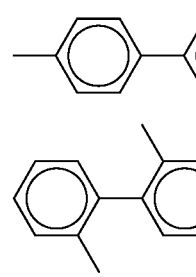
(v)

(vi)

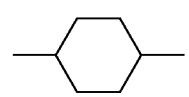
(vii)

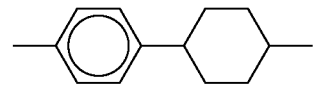
(viii)

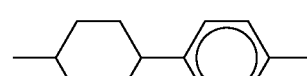
(ix)

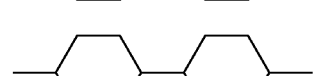
(x)

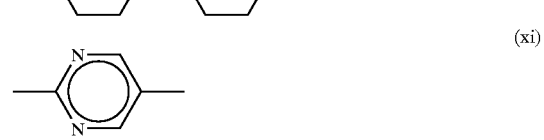
(xi)

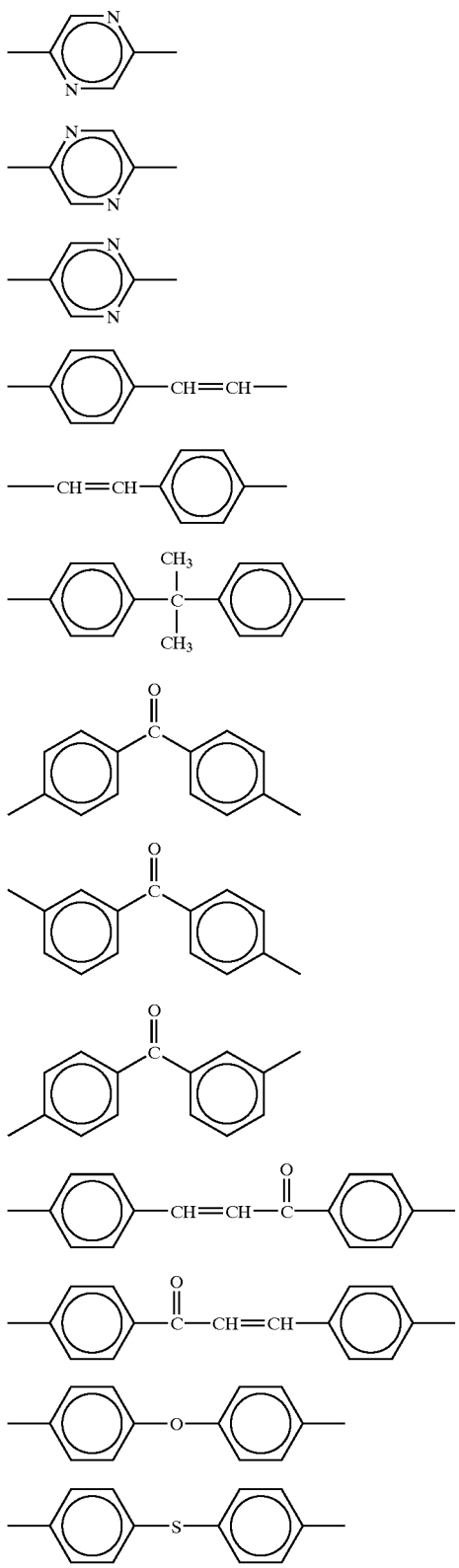

In the above general formula (3) or (4) showing the compound (III), $R^4$ represents hydrogen or methyl group; Y is one of the above-enumerated groups (i) to (xxiv), preferably the group (i), (ii), (iii), (v) or (vii); and $\underline{d}$ and $\underline{e}$ that show the chain lengths of the alkylene groups are independently an integer between 2 and 12, preferably between 4 and 10, more preferably between 6 and 9. Those compounds represented by the above general formula (3) or (4) in which $\underline{d}$ or $\underline{e}$ is 0 or 1 are poor in stability, readily undergo hydrolysis, and have high crystallinity, while those compounds having $\underline{d}$ or $\underline{e}$ of 13 or more have low melting points (Tm's). These compounds are less compatible with the compounds (I) and (II) having liquid crystallinity, and can cause phase separation or the like in the liquid crystalline composition depending upon the compound content of the liquid crystalline composition.

It is herein preferable to use, as the chiral agent, a polymerizable one. If a polymerizable chiral agent is incorporated into the liquid crystalline composition, the composition is wholly polymerized and the cholesteric regularity is stably fixed. The use of a polymerizable chiral agent is thus very favorable from the viewpoint of thermal stability, solvent resistance, and so on.

The amount of the chiral agent to be incorporated into the liquid crystalline composition is optimally determined with the following points in mind: the ability of the chiral agent to cause liquid crystalline molecules to align in helical fashion, the cholesteric regularity of the circular polarization controlling optical element finally obtained, and the like. In general, however, the amount of the chiral agent is selected from the range between 0.01 parts and 60 parts by weight, preferably between 0.1 parts and 40 parts by weight, more preferably between 0.5 parts and 30 parts by weight, most preferably between 1 part and 20 parts by weight, for 100 parts by weight of the compound (I) or (II) singly used in the liquid crystalline composition or of the total of the compounds (I) and (II) used in combination. In the case where the chiral agent is used in an amount of less than the above-described range, the liquid crystalline composition obtained may not develop sufficiently high cholesteric regularity. On the other hand, if the chiral agent is used in an amount of more than the above-described range, the alignment of liquid crystalline molecules is hindered; this may adversely affect the curing of the liquid crystalline composition that is caused by active radiation.

(1.1.3. Polymerization Initiator)

It is preferable to incorporate a polymerization initiator into the liquid crystalline composition according to the first embodiment of the present invention so that polymerization is efficiently promoted when the liquid crystalline composition is cured. In the present invention, since ultraviolet light (UV) or the like is preferably used as the active radiation, it is preferable to use a photopolymerization initiator. However, even if a photopolymerization initiator is not contained in the liquid crystalline composition, it is possible to cure the composition by applying electron beams. If ultraviolet light (UV) is used as the active radiation, it is desirable to incorporate one of, or two or more of the photopolymerization initiators described below into the liquid crystalline composition in an amount of 0.01 to 20% by weight, preferably 0.5 to 10% by weight, more preferably 0.1 to 5% by weight, of the liquid crystalline composition, as needed.

Examples of photopolymerization initiators that can be added to the liquid crystalline composition include benzyl (also called bibenzoyl), benzoin isobutyl ether, benzoin isopropyl ether, benzophenone, benzoylbenzoic acid, methyl benzoylbenzoate, 4-benzoyl-4'-methyl diphenyl sulfide, benzyl methyl ketal, dimethylaminomethylbenzoate, 2-n- butoxyethyl-4-dimethylamino-benzoate, isoamyl p-dimethylaminobenzoate, 3,3'-dimethyl-4-methoxy-benzophenone, methylbenzoylformate, 2-methyl-1-(4-(methylthio)phenyl)-2-morpholinopropan-1-one, 2-benzyl-2-dimethylamino-1-(4-morpholinophenyl)-butan-1-one, 1-(4-dodecylphenyl)-2-hydroxy-2-methylpropan-1-one, 1-hydroxycyclohexylphenyl ketone, 2-hydroxy-2-methyl-1-phenylpropan-1-one, 1-(4-isopropylphenyl)-2-hydroxy-2-methylpropan-1-one, 2-chlorothioxanthone, 2,4-diethylthioxanthone, 2,4-diisopropylthioxanthone, 2,4-dimethylthioxanthone, isopropylthioxanthone and 1-chloro-4-propoxythioxanthone. Besides the photopolymerization initiator, sensitizers may also be added to the liquid crystalline composition within limits not prejudicial to the attainment of the object of the invention.

(1.1.4. Additives)

Compounds other than the above-described ones may also be incorporated into the liquid crystalline composition according to the first embodiment of the present invention within limits not prejudicial to the attainment of the object of the invention. Examples of compounds that can be added include: (1) polyester (meth) acrylates produced by reacting (meth)acrylic acid with polyester prepolymers that can be obtained by condensation between polyhydric alcohols and mono- or poly-basic acids; (2) polyurethane (meth)acrylates produced by reacting polyols with compounds having two isocyanate groups and then reacting the reaction products with (meth)acrylic acid; (3) photopolymerizable compounds, for example, epoxy (meth)acrylates produced by reacting (meth) acrylic acid with such epoxy resins as bisphenol A epoxy resins, bisphenol F epoxy resins, novolak epoxy resins, polycarboxylic acid polyglycidyl esters, polyol polyglycidyl diethers, aliphatic or alicyclic epoxy resins, amine epoxy resins, triphenol methane epoxy resins or dihidroxybenzene epoxy resins; and (4) photopolymerizable liquid crystalline compounds having acrylic or methacrylic group.

The amount of these compounds to be incorporated into the liquid crystalline composition according to the first embodiment of the present invention is determined within limits not prejudicial to the attainment of the object of the invention, and it is generally not more than 40% by weight, preferably not more than 20% by weight, of the liquid crystalline composition. The addition of these compounds leads to improvement in the curing characteristics of the liquid crystalline composition. As a result, the cured cholesteric layer has increased mechanical strength, and the liquid crystal shows improved stability.

(1.1.5. Solvent)

The aforementioned liquid crystalline composition is applied to the substrate 9 having aligning power to form thereon the liquid crystal layer 3, and any of the application techniques previously mentioned can be employed for this purpose. It is herein convenient to use a solution of the liquid crystalline composition dissolved in a proper solvent.

Any solvent can be used in the first embodiment of the present invention as long as it can dissolve the above-described polymerizable liquid crystalline material, and so forth, and does not mar the aligning power which the substrate 9 has.

Specifically, it is herein possible to use one of, or two or more of the following solvents: hydrocarbons such as benzene, toluene, xylene, n-butyl benzene, diethyl benzene and tetralin; ethers such as methoxybenzene, 1,2-dimethoxybenzene and diethylene glycol dimethyl ether; ketones such as acetone, methyl ethyl ketone, methyl isobutyl ketone, cyclohexanone and 2,4-pentandione; esters such as ethyl acetate, ethylene glycol monomethyl ether acetate, propylene glycol monomethyl ether acetate, propylene glycol monoethyl ether acetate and y-butyrolactone; amides such as 2-pyrrolidone, N-methyl-2-pyrrolidone, dimethylformamide and dimethylacetamide; halogen-containing solvents such as chloroform, dichloromethane, carbon tetrachloride, dichloroethane, tetrachloroethane, trichloroethylene, tetrachloroethylene, chlorobenzene and orthodichlorobenzene; alcohols such as t-butyl alcohol, diacetone alcohol, glycerin, monoacetin, ethylene glycol, triethylene glycol, hexylene glycol, ethylene glycol monomethyl ether, ethyl cellosolve and butyl cellosolve; and phenols such as phenol and parachlorophenol.

The use of a solvent of only one type can be the cause of such troubles that the solvent cannot fully dissolve the liquid crystalline composition and that the solvent erodes the substrate having aligning power. These troubles, however, are avoidable if a mixture of solvents of two or more different types is used. Of the above-enumerated solvents, solvents suitable for single use are hydrocarbons and glycol monoether acetates. Solvent mixtures herein preferred are mixtures of ethers or ketones and glycols. The concentration of the liquid crystalline composition in the solvent solution depends on the solubility of the liquid crystalline composition in the solvent and on the film thickness of the circular polarization controlling optical element to be obtained, so that it cannot be specified sweepingly. It is, however, proper to control the concentration so that it falls generally in the range between 1% and 60% by weight, preferably between 3% and 40% by weight.

(1.2. Substrate Having Aligning Power)

As mentioned previously, a material composed of a base 1 and an alignment layer 2 formed on the base 1 can be used as the substrate 9 having aligning power. Alternatively, a base having aligning power on its surface (e.g., an oriented film, etc.) may also be used as the substrate 9.

Any base can be used as the base 1 in the former case as long as it is made from a transparent material. Examples of transparent materials useful herein include transparent rigid materials having no flexibility, such as silica glass, Pyrex (registered trademark) and synthetic silica plates, and transparent flexible materials such as resin plates for optical use and transparent resin films. Those alignment layers usually used for liquid crystal displays or the like are favorably used for the alignment layer 2, and, in general, an alignment layer made from polyimide, polyamide, polyvinyl alcohol or the like, subjected to rubbing treatment, is suitably used. The rubbing treatment is usually conducted in the following manner: rubbing cloth made from rayon, cotton, polyamide or the like is wound around a metallic roller, and this roller is rotated while keeping it in contact with a film of polyimide or the like, or the film is fed with the roller fixed, thereby rubbing the film surface. Alternatively, the alignment layer 2 having aligning power may be formed by obliquely depositing silicon oxide on the base 1.

On the other hand, any of plastic films made from the following compounds can be used as the base in the latter case described above: polyimide, polyamide imide, polyamide, polyether imide, polyether ether ketone, polyether ketone, polyketone sulfide, polyether sulfone, polysulfone, polyphenylene sulfide, polyphenylene oxide, polyethylene terephthalate, polybutylene terephthalate, polyethylene naphthalate, polyacetal, polycarbonate, polyacrylate, acrylic resins, polyvinyl alcohol, polypropylene, cellulose, triacetyl cellulose and partial saponification products thereof, epoxy resins, and phenol resins. The plastic film may be a laminate of films of two or more different types. The base may be subjected in advance to such surface treatment as hydrophilicity- or hydrophobicity-imparting treatment. Although it is not necessary to separately impart aligning power to the base depending on the composition of the liquid crystalline composition contained in the solution, it is preferable to impart aligning power to the base before applying thereto the solution. To impart aligning power to a flexible material selected from the above-described ones, the material may be mono- or bi-axially oriented so that the base itself can have aligning power. Instead of such a base, it is possible to use a metallic base made from aluminum, iron, copper or the like, having a surface with slit-shaped grooves, or a glass base made of alkaline glass, borosilicate glass, flint glass or the like, having a surface with slits made by etching.

(2. Step of Forming Semi-Cured Cholesteric Layer)

In the step of forming a semi-cured cholesteric layer, active radiation 4 with a radiant intensity lower than that with which the liquid crystal layer 3 is fully cured is firstly applied pattern-wise, through a photomask 10, to the liquid crystal layer 3 to form therein a semi-cured area 3a in a predetermined pattern, as shown in FIG. 1(b). Namely, by selectively applying the active radiation 4 to the desired part of the liquid crystal layer 3, the area 3a in the liquid crystal layer 3 irradiated with the active radiation 4 is made into the semi-cured state. Next, as shown in FIG. 1(c), the liquid crystal layer 3 having the semi-cured area 3a in a predetermined pattern is brought into contact with a solvent 5 for development, and the developed liquid crystal layer 3 is then washed. As a result, the area 3b in the liquid crystal layer 3 not irradiated with the active radiation 4 is removed, while the semi-cured area 3a irradiated with the active radiation 4 remains. Thus, a semi-cured cholesteric layer 3' having therein a predetermined pattern (equivalent to the area 3a) is obtained, as shown in FIG. 1(d).

In the above-described photolithographic process, washing of the developed liquid crystal layer 3 for removing the non-irradiated area 3b may be conducted by a shake washing method as shown in FIG. 1(c), where the base 1 having thereon the liquid crystal layer 3 is immersed in a proper solvent 5, followed by shaking. Other methods useful for this purpose include a spin washing method, not shown in the figure, where a solvent is sprayed over the liquid crystal layer 3 formed on the base 1 while spinning the base 1 at a high speed.

Preferably, the semi-cured cholesteric layer 3' formed in the above-described step of forming a semi-cured cholesteric layer is in such a state that functional groups in an amount of 10 to 80 mol %, preferably 20 to 70 mol %, of the total functional groups contained in the aforementioned polymerizable chiral agent and polymerizable liquid crystalline material capable of developing nematic regularity have been polymerized.

The active radiation 4 and the solvent 5 for use in the above-described step of forming a semi-cured cholesteric layer will be described in detail hereinafter.

(2.1. Active Radiation)

Any active radiation can be used as the active radiation 4 in the aforementioned step of forming a semi-cured cholesteric layer as long as it can cure the above-described polymerizable liquid crystalline material, and electron beams, ultraviolet light, visible light, infrared light (heat rays), or the like can be used depending upon the conditions to be employed. Taking simplicity of the production system into consideration, radiation such as ultraviolet or visible light is usually used as the active radiation 4. The wavelength of the light is from 150 to 500 nm, preferably from 250 to 450 nm, more preferably from 300 to 400 nm.

Examples of sources of the above light include low-pressure mercury vapor lamps (germicidal lamps, fluorescent chemical lamps, black lamps), high-pressure discharge lamps (high-pressure mercury vapor lamps, metallic halide lamps), and short arc discharge lamps (extra-high-pressure mercury vapor lamps, xenon lamps, mercury xenon lamps). Of these, a metallic halide, xenon or high-pressure mercury vapor lamp is preferably used.

The radiant intensity of the active radiation is properly controlled depending on the composition of the polymerizable liquid crystalline composition constituting the liquid crystal layer 3 and also on the amount of the photopolymerization initiator contained in the liquid crystalline composition. Specifically, it is preferable to apply the active radiation with a radiant intensity of 0.001 to 90%, preferably 0.01 to 50%, more preferably 0.1 to 10%, of that of active radiation to be used in the step of forming a cured cholesteric layer, which will be described later.

While the active radiation 4 is applied to the liquid crystal layer 3 in the above-described manner, the liquid crystal layer 3 may be heated. If the liquid crystal layer 3 is heated, the sensitivity of the liquid crystal layer 3 increases, so that it is possible to cure the liquid crystal layer 3 with high efficiency.

(2.2. Solvent)

The solvent 5 for use in the above-described step of forming a semi-cured cholesteric layer is required to have not only the properties essential to conventional developers (the property of removing the non-irradiated part 3b of the liquid crystal layer 3), but also the property of not removing the semi-cured area 3a in the liquid crystal layer 3, that of not selectively dissolving away the uncured components of the liquid crystalline composition in the semi-cured area 3a, and that of not dissolving the surface of the substrate 9 (the alignment layer 2 formed on the base 1, etc.). Examples of solvents having these properties include such organic solvents as acetone, 3-methoxy-butyl acetate, diglyme, cyclohexanone, THF (tetrahydrofuran), toluene, methylene chloride and MEK (methyl ethyl ketone).

(3. Wave-Range-Broadening Step)

In the wave-range-broadening step, while heating (see reference numeral 7) one surface of the semi-cured cholesteric layer 3' (the surface on the substrate 9 side), active radiation 6 is applied to the other surface, as shown in FIG. 1(e). In this step, properly selecting the type of the atmosphere in which the step is effected and the contents of the liquid crystalline composition, and properly controlling the radiant intensity of the active radiation 6, a curing rate gradient is formed in the semi-cured cholesteric layer 3' between the substrate 9 side surface and the surface opposite to it, and while retaining this curing rate gradient, the semi-cured cholesteric layer 3' is cured to broaden its selective reflection wave range.

(3.1. Principle of Wave-Range-Broadening Technique)

The semi-cured cholesteric layer 3' whose selective reflection wave range will be broadened has cholesteric regularity and also the property of causing positive double refraction of light because it contains the polymerizable chiral agent and the polymerizable liquid crystal line material capable of developing nematic regularity. In the case where the substrate 9 having aligning power imparted by rubbing treatment or the like is used and the liquid crystalline composition is applied to this substrate 9 to align liquid crystalline molecules, the axis of the director of the liquid crystalline molecules at the interface between the substrate 9 and the semi-cured cholesteric layer 3', projected on the plane of the semi-cured cholesteric layer 3' (hereinafter referred to as "axis of orientation") is determined by the direction in which the substrate 9 has been rubbed (hereinafter referred to as "axis of rubbing"). The director of the liquid crystalline molecules rotates in the direction of the film thickness, and the angle of rotation is a value characteristic of the semi-cured cholesteric layer 3'. Although a variety of optical parameters of the circular polarization controlling optical element finally obtained from the semi-cured cholesteric layer 3', such as the width of the selective reflection wave range, the thickness of the optical element, the helical pitch of the liquid crystalline molecules and the number of the helixes, may be controlled depending upon the intended use of the circular polarization controlling optical element, the selective reflection wave range is generally from 30 to 100 nm. However, in the case where a circular polarization controlling optical element having the above-described selective reflection wave range is incorporated in a liquid crystal display or the like, such a trouble may occur that the color of the liquid crystal itself is bright, but the reflected light is dark, or vice versa. Improvement in visibility may be required for such a circular polarization controlling optical element depending upon its use.

In the present invention, the selective reflection wave range of the circular polarization controlling optical element is made broader than the above-described range in the wave-range-broadening step to improve visibility. In the invention, since the wave-range-broadening step is effected after once making the liquid crystal layer into the semi-cured state in the step of forming a semi-cured cholesteric layer, there inevitably exists a limit to which the selective reflection wave range can be broadened. It is therefore possible to prevent the selective reflection wave range from being excessively broadened, and lowering of visibility that is caused by the excessive broadening of the selective reflection wave range can thus be avoided.

The selective reflection wave range herein refers to a wave range in which the reflectance of selectively reflected light is nearly half of the maximum reflectance when light circularly polarized in the same direction as that of the helical pitch of liquid crystalline molecules constituting cholesteric regularity is incident on a circular polarization controlling optical element.

The selective reflection wave range $\Delta\lambda$ is shown by the following equation:

$$\Delta\lambda = \Delta n \cdot p$$

wherein $\Delta n$ is the index of double refraction, and $p$ is the helical pitch.

As the above equation clearly shows, the selective reflection wave range $\Delta\lambda$ is a function of helical pitch $p$. Therefore, by varying the helical pitch in the semi-cured cholesteric layer 3' between the substrate 9 side and the opposite side, it is possible to accomplish the broadening of the selective reflection wave range $\Delta\lambda$ within predetermined limits. To vary the helical pitch $p$, it is proper to change the content, in the semi-cured cholesteric layer 3', of the polymerizable chiral agent having the function of causing liquid crystalline molecules to align in helical fashion.

The content of the polymerizable chiral agent that is uniformly distributed in the semi-cured cholesteric layer 3' can be varied according to curing rate. The reason for this is as follows: the ease of curing of the liquid crystalline composition varies depending upon the components; therefore, in the case where the curing of the liquid crystalline composition proceeds mildly, the ease of curing of the components gradually varies according to the curing rate gradient, and, as a result, a composition gradient also occurs in the liquid crystalline composition. Therefore, if a polymerizable chiral agent content gradient occurs in the semi-cured cholesteric layer 3' between the substrate 9 side and the opposite side by forming therein a curing rate gradient, the helical pitch in the semi-cured cholesteric layer 3' varies between its two surface. It thus becomes possible to broaden the selective reflection wave range $\Delta\lambda$ of the semi-cured cholesteric layer 3'.

Namely, as mentioned above, the formation of a curing rate gradient in the semi-cured cholesteric layer 3' makes it possible to obtain a circular polarization controlling optical element having a broadened selective reflection wave range.

Specifically, there are two methods useful for forming a curing rate gradient in the semi-cured cholesteric layer 3' between its two surfaces: a method making chiefly use of oxygen that acts to hinder curing, and a method making mainly use of active radiation that acts to promote curing. Two embodiments using these methods will be described in detail hereinafter.

(3.2. Wave-Range-Broadening Step Using Oxygen)

In the case where the semi-cured cholesteric layer 3' contains an oxygen-dependent polymerization initiator, oxygen acts to hinder the curing of the semi-cured cholesteric layer 3' formed in the aforementioned step of forming a semi-cured cholesteric layer. Therefore, when active radiation 6 with a radiant intensity lower than that of active radiation 8 to be used in the step of forming a cured cholesteric layer (a radiant intensity with which the above-described curing-hindering action of oxygen is not impaired) is applied to the semi-cured cholesteric layer 3' while exposing its one surface to an atmosphere of oxygen that acts to hinder curing, a curing rate gradient occurs in the semi-cured cholesteric layer 3' between the substrate 9 side surface and the surface opposite to it. The semi-cured cholesteric layer 3' is cured while retaining this curing rate gradient to broaden its selective reflection wave range.

One possible way to expose only one of the two surfaces of the semi-cured cholesteric layer 3' to an atmosphere of oxygen is to use an oxygen-impermeable material for the substrate 9. Another possible way is as follows: an oxygen-permeable material is used for the substrate 9, and only the surface of the semi-cured cholesteric layer 3' on the side opposite to the substrate 9 is exposed to an oxygen-free atmosphere or an atmosphere with an oxygen content low enough not to show the curing-hindering action. Further, in the case where the semi-cured cholesteric layer 3' is sandwiched between two substrates, an oxygen-permeable material is used for one substrate, and an oxygen-impermeable material, for the other.

The oxygen content of the atmosphere in which this step is effected is 10% or more, preferably 12% or more, particularly 14% or more. As long as the oxygen content falls in this range, there can be satisfactorily obtained the effect of hindering the curing of the semi-cured cholesteric layer 3'. The atmosphere of oxygen may be that of air. In this case, no extra equipment or the like is needed, so that it is easy to operate the production system. The use of an atmosphere of air is thus very advantageous from the viewpoint of efficiency and cost.

While exposing one surface of the semi-cured cholesteric layer 3' to an atmosphere of oxygen with its oxygen content kept in the above-described range, active radiation is applied to the semi-cured cholesteric layer 3' so that the curing of the semi-cured cholesteric layer 3' proceeds mildly. The radiant intensity of the active radiation 6 herein used is controlled so that the curing-hindering action of oxygen is not impaired and that a curing rate gradient can be formed satisfactorily. It is preferable to make the radiant intensity of the active radiation 6 from 0.001 to 90%, preferably from 0.01 to 50%, particularly from 0.1 to 10%, of that of active radiation 8 to be used in the step of forming a cured cholesteric layer, which will be described later. If the radiant intensity of the active radiation 6 is made higher than the above-described range, the curing of the semi-cured cholesteric layer 3' is promoted surpassing the curing-hindering action of oxygen, so that the formation of a curing rate gradient is prevented. On the other hand, if the radiant intensity of the active ration 6 is made lower than the above-described range, the semi-cured cholesteric layer 3' is not cured at all; such a low radiant intensity is thus unsuitable.

In the above-described wave-range-broadening step using oxygen, a curing rate gradient occurs in the semi-cured cholesteric layer between its two surfaces owing chiefly to oxygen, so that it is favorable to use, as the polymerization initiator, an oxygen-dependent one. In particular, if a polymerization initiator having high oxygen dependency is used, the curing-hindering action of oxygen surpasses the curing-promoting action of the active radiation, so that a curing rate gradient occurs efficiently. Polymerization initiators that can be used in the first embodiment of the present invention are as mentioned above. Of those, polymerization initiators having high oxygen dependency are specifically Irg 184 and Irg 819 (trademarks, available from Ciba Specialty Chemicals K.K., Japan), TPO (trademark, manufactured by BASF CORPORATION), and so forth. It is noted that even a polymerization initiator having low oxygen dependency can be used if the amount to be used is properly controlled.

In order to provide a liquid crystalline composition concentration gradient as the curing rate gradient occurs in the above-described manner, it is necessary that the uncured components be fluidized in the semi-cured cholesteric layer 3'. To satisfactorily cause the fluidization of the uncured components, it is preferable to effect the wave-range-broadening step while heating both the substrate 9 and the semi-cured cholesteric layer 3'. However, the curing of the semi-cured cholesteric layer 3' is excessively promoted if the heating temperature is improper. It is therefore preferable to make the heating temperature from 30 to 150° C., preferably from 40 to 140° C., particularly from 50 to 130° C. As long as the heating temperature falls in this range, although the uncured components of the liquid crystalline composition are well fluidized, the curing of the semi-cured cholesteric layer 3' is not promoted.

(3.3. Wave-Range-Broadening Step Using Weak Active Radiation)

Since the liquid crystalline composition is of active-radiation-curing type, active radiation facilitates the polymerization of the liquid crystalline composition and acts to promote the curing of the semi-cured cholesteric layer 3'. Therefore, if active radiation is applied only to one surface of the semi-cured cholesteric layer 3', a curing rate gradient occurs in the semi-cured cholesteric layer 3' between the substrate 9 side surface and the surface opposite to it. By curing the semi-cured cholesteric layer 3' while retaining this curing rate gradient, it is possible to broaden the selective reflection wave range of the semi-cured cholesteric layer 3'.

In this wave-range-broadening step, it is necessary to make the radiant intensity of the active radiation 6 low so that the curing of the semi-cured cholesteric layer 3' proceeds mildly and that a curing rate gradient occurs in the semi-cured cholesteric layer 3' between the substrate 9 side surface and the surface opposite to it. Such a radiant intensity is about 0.1 to about 10%, preferably 2 to 9%, particularly 3 to 8%, of the radiant intensity of active radiation 8 to be used in the step of forming a cured cholesteric layer, which will be described later. A radiant intensity higher than the above-described range is unfavorable because the curing of the semi-cured cholesteric layer 3' proceeds rapidly with such a high radiant intensity, and the semi-cured cholesteric layer 3' unfavorably cures without undergoing the formation of a curing rate gradient. On the other hand, a radiant intensity lower than the above-described range is unsuitable because if radiant intensity with such a low radiant intensity is applied, it takes a lot of time to cure the semi-cured cholesteric layer 3' to such a degree that a curing rate gradient occurs in it.

As in the case of the active radiation 4 to be used in the above-described step of forming a semi-cured cholesteric layer, any of electron beams, ultraviolet light, visible light, infrared light (heat rays), and so forth can be used as the active radiation 6. If active radiation unable to greatly facilitate the polymerization of the liquid crystalline composition, such as ultraviolet light, is used as the active radiation 6, it is preferable to use a photopolymerization initiator to enhance polymerization efficiency.

The wave-range-broadening step using weak active radiation has two embodiments depending on whether oxygen is present or not. The details of these two embodiments will be given below.

(3.3.1. Wave-Range-Broadening Step Using Weak Active Radiation, Effected in Oxygen-Free Atmosphere)

As mentioned above, oxygen acts to hinder the curing of the semi-cured cholesteric layer 3' especially when an oxygen-dependent polymerization initiator is present in the semi-cured cholesteric layer 3'. To avoid the influence of oxygen, therefore, the active radiation 6 is applied, in an oxygen-free atmosphere, only to one surface of the semi-cured cholesteric layer 3', that is, either the surface on the substrate 9 side or the surface opposite to it. As a result, a curing rate gradient is efficiently formed in the semi-cured cholesteric layer 3' between its two surfaces, and the selective reflection wave range of the semi-cured cholesteric layer 3' can thus be broadened.

The oxygen-free atmosphere to be used in this embodiment may be an atmosphere of a gas having no influence on the curing of the semi-cured cholesteric layer 3', and an atmosphere of nitrogen may be used, for example.

(3.3.2. Wave-Range-Broadening Step Using Weak Active Radiation, Effected in Atmosphere of Oxygen)

The polymerization of the liquid crystalline composition proceeds at a decreased rate in an atmosphere of oxygen especially when the liquid crystalline composition contains an oxygen-dependent polymerization initiator.

This embodiment is that the selective reflection wave range of the semi-cured cholesteric layer 3' is broadened by the application of weak active radiation 6. If both surfaces of the semi-cured cholesteric layer 3' are exposed to an atmosphere with the very same oxygen content, the selective reflection wave range can be broadened without any problem. However, in the case where the two surfaces of the semi-cured cholesteric layer 3' are exposed to atmospheres with different oxygen contents and if the semi-cured cholesteric layer 3' contains a polymerization initiator with high oxygen dependency, the difference between the rate of polymerization at one surface of the semi-cured cholesteric layer 3' and that at the other surface becomes great even if the difference between the oxygen contents is extremely small. It is therefore desirable to use, in such a case, a polymerization initiator having extremely low oxygen dependency.

Specific examples of polymerization initiators having low oxygen dependency, useful herein include Irg 365, Irg 907, Irg 651, Irg 369 and Parocare 1173 (trademarks, available from Ciba Specialty Chemicals K.K., Japan), DET X-S (trademark, manufactured by Nippon Kayaku Co., Ltd., Japan), and Biimidazole (trademark, manufactured by Kurogane Kasei Co., Ltd., Japan).

In this embodiment, on the other hand, only the surface of the semi-cured cholesteric layer 3' opposite to the surface to be irradiated with the weak active radiation 6 may be exposed to an atmosphere of oxygen. In this case, the curing of the semi-cured cholesteric layer 3' is promoted on one surface and is hindered on the other, so that a great curing rate gradient occurs in the semi-cured cholesteric layer 3' in the direction intersecting its two surfaces. The selective reflection wave range of the semi-cured cholesteric layer 3' can thus be greatly broadened.

Specifically, it is possible to broaden the selective reflection wave range of the semi-cured cholesteric layer 3' in the following manner: an oxygen-impermeable material is used for the substrate 9, and the weak active radiation 6 is applied to the semi-cured cholesteric layer 3' from the substrate 9 side in an atmosphere of oxygen; or an oxygen-permeable material is used for the substrate 9, and the weak active radiation 6 is applied to the surface of the semi-cured cholesteric layer 3' opposite to the surface on the substrate 9 side, while exposing this surface to an oxygen-free atmosphere. Further, the semi-cured cholesteric layer 3' may be sandwiched between two substrates. In this case, an oxygen-permeable material is used for one of the substrates, and an oxygen-impermeable material, for the other, and the weak active radiation is applied to the semi-cured cholesteric layer 3' from the oxygen-impermeable substrate side.

In the case where, while exposing only one surface of the semi-cured cholesteric layer 3' to an atmosphere of oxygen, the weak active radiation 6 is applied to the other surface, both the action of the active radiation and that of oxygen are utilized, so that it is preferable to use, as the polymerization initiator, a highly oxygen dependent one. Those polymerization initiators enumerated in the above section (3.2. Wave-Range-Broadening Step Using Oxygen) can be used also in this step as the polymerization initiator having high oxygen dependency.

It is preferable to effect this wave-range-broadening step while heating both the substrate 9 and the semi-cured cholesteric layer 3' as in the above-described wave-range-broadening step using oxygen.

(4. Step of Forming Cured Cholesteric Layer)

In the step of forming a cured cholesteric layer, the semi-cured cholesteric layer 3' having the broadened selective reflection wave range is cured by the application of active radiation 8, as shown in FIG. 1(f), while retaining the cholesteric regularity which the semi-cured cholesteric layer 3' has developed in the course of broadening of its selective reflection wave range, thereby obtaining a cured cholesteric layer 3".

The active radiation 8 to be used in this step of forming a cured cholesteric layer may be the same as the active radiation 4 to be used in the step of forming a semi-cured cholesteric layer or the active radiation 6 to be used in the wave-range-broadening step, so that no explanation is given for the active radiation 8 any more.

In order to fully cure the semi-cured cholesteric layer 3' while retaining its broadened selective reflection wave range, it is preferable to make the radiant intensity of the active radiation 8 from 0.1 to 1000 mW/cm$^2$, preferably from 1 to 100 mW/cm$^2$ (from 1 to 10000 mJ/cm$^2$, preferably from 10 to 1000 mJ/cm$^2$, if expressed in irradiation quantity).

In this step of forming a cured cholesteric layer, not only active radiation but also heat can be used to cure the semi-cured cholesteric layer 3'. In the latter case, it is proper to heat the semi-cured cholesteric layer 3' at a temperature of approximately 150 to 250° C. for about 10 to 120 minutes, for example.

A circular polarization controlling optical element having a selective reflection wave range broadened to a proper limit can thus be obtained via a series of the aforementioned steps.

(5. Others)

(5.1. Multi-Layering of Cured Cholesteric Layer)

A circular polarization controlling optical element containing a monochromatic cured-cholesteric layer 3" in a predetermined pattern can be successfully obtained through a series of the above-described steps. However, a series of the above-described steps (the step of forming a liquid crystal layer, the step of forming a semi-cured cholesteric layer, the wave-range-broadening step and the step of forming a cured cholesteric layer) may be repeated to form two or more cholesteric layers. By doing so, it is possible to form a plurality of cholesteric layers with broadened selective reflection wave ranges, so that it becomes possible to produce a color filter in which cholesteric layers of two or more selective reflection colors are arranged or laminated. In addition, a further broadened selective reflection wave range can be obtained by laminating those cholesteric layers having selective reflection wave ranges whose central wavelengths are slightly different from each other within a predetermined range.

In the step of forming the second and later liquid crystal layers in the above method, after forming an alignment layer on the cured cholesteric layer that has already been formed, an active-radiation-curing liquid crystal layer may be formed on this alignment layer by the use of the previously described liquid crystalline composition. Alternatively, an active-radiation-curing liquid crystal layer may be formed, with the use of the previously described liquid crystalline composition, directly on the cured cholesteric layer that has already been formed. These manners are properly employed depending upon the use, properties, etc. of the cholesteric layer to be formed.

Conditions, materials, and so forth for use in the step of forming a liquid crystal layer, the step of forming a semi-cured cholesteric layer, the wave-range-broadening step and the step of forming a cured cholesteric layer that are effected to form the second and later liquid crystal layers are the same as those described above, so that they are not described here any more.

In the case where two or more cured cholesteric layers are formed in the above-described way, it is not necessary that all of the cholesteric layers have broadened selective reflection wave ranges, and it is enough that only some of the cholesteric layers have broadened selective reflection wave ranges so that the resulting optical element can meet the intended use.

(5.2. Multi-Coloring of Cured Cholesteric Layer)

Preferably, two or more cured cholesteric layers formed in the above-described manner have different selective reflection colors and are in different predetermined patterns. For example, by preparing liquid crystalline compositions corresponding to red (R), green (G) and blue (B) colors, and repeatedly conducting a series of the above-described steps (the step of forming a liquid crystal layer, the step of forming a semi-cured cholesteric layer, the wave-range-broadening step and the step of forming a cured cholesteric layer) using each liquid crystalline composition, cured cholesteric layers corresponding to red (R), green (G) and blue (B) colors are formed. By this, it becomes possible to obtain a color filter in which cholesteric layers of two or more selective reflection colors, having broadened selective reflection wave ranges, are arranged or laminated.

[B. Second Embodiment]

Figure 2:
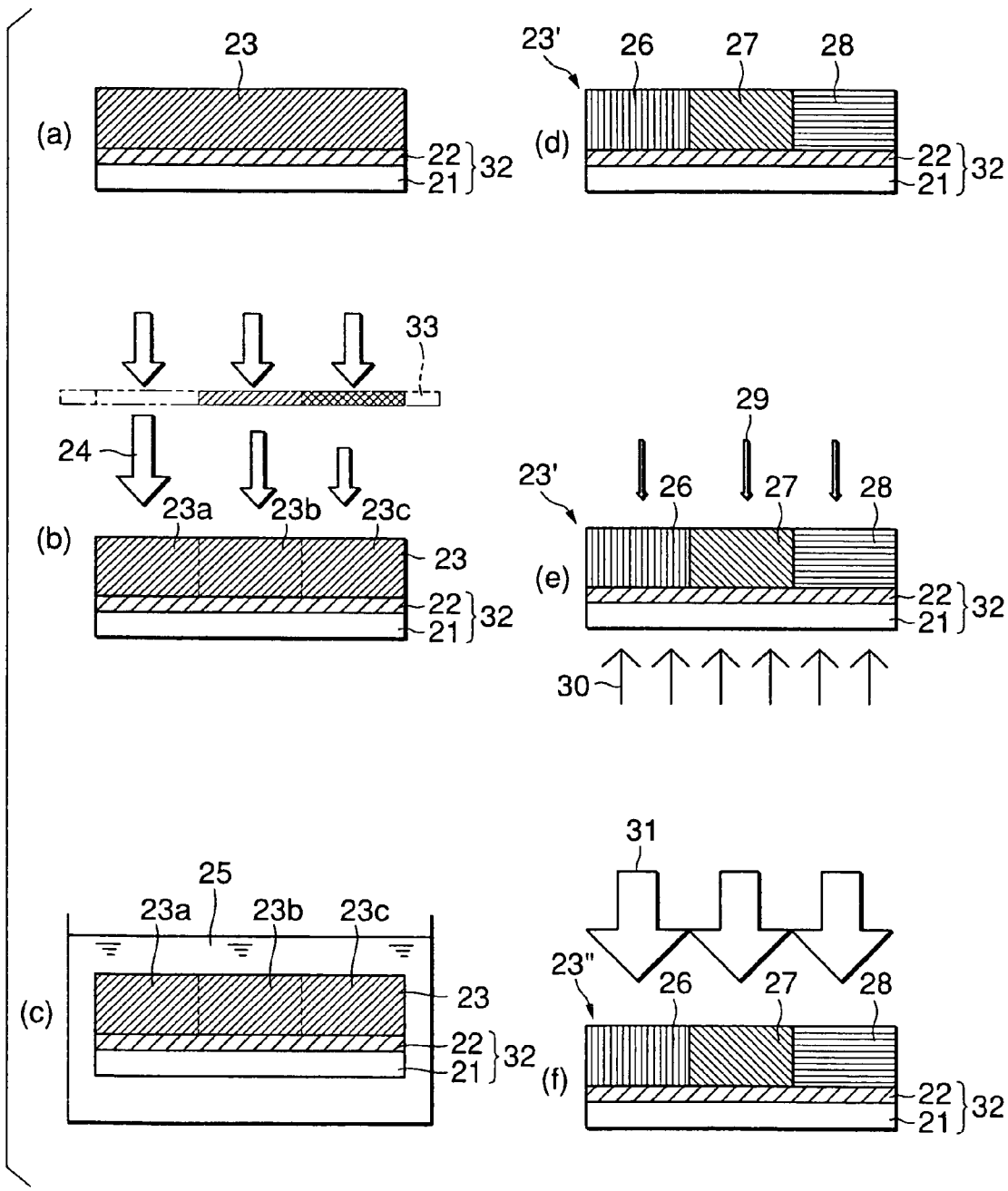
FIG. 2 is a flow chart for illustrating the method of producing a circular polarization controlling optical element according to the second embodiment of the present invention.

Next, the method of producing a circular polarization controlling optical element according to the second embodiment of the present invention will be described hereinafter by referring to FIG. 2. The second embodiment of the invention is that a liquid crystal layer in which semi-cured areas in a plurality of patterns with different degrees of cure have been formed is brought into contact with a solvent to pattern the semi-cured cholesteric layer.

First of all, an active-radiation-curing liquid crystalline composition is applied to an alignment layer 22 formed on a base 21, as shown in FIG. 2(a), and the liquid crystal alignment is regulated, for example, by heating, thereby forming a liquid crystal layer 23 having cholesteric regularity (the step of forming a liquid crystal layer). The alignment layer 22 is a layer formed on the base 21 by coating, having aligning power imparted by rubbing treatment or the like. The base 21 and the alignment layer 22 constitute a substrate 32 having aligning power.

Next, as shown in FIGS. 2(b), 2(c) and 2(d), active radiation 24 with different radiant intensities is applied pattern-wise, through a photomask 33, to the liquid crystal layer 23 formed on the substrate 32 having aligning power to form therein semi-cured areas 23a, 23b and 23c in three patterns with different degrees of cure; this liquid crystal layer 23 is then brought into contact with a solvent 25 to selectively dissolve away the uncured components of the liquid crystal layer 23, that is, the polymerizable chiral agent and the polymerizable liquid crystalline material capable of developing nematic regularity, whereby a semi-cured cholesteric layer 23' having three patterns 26, 27 and 28 of different selective reflection colors is obtained (the step of forming a semi-cured cholesteric layer).

Thereafter, as shown in FIG. 2(e), while heating (see reference numeral 30) one surface (the substrate 32 side surface) of the semi-cured cholesteric layer 23' having therein the three patterns 26, 27 and 28 of different selective reflection colors, active radiation 29 is applied to the other surface to form a curing rate gradient in the semi-cured cholesteric layer 23' between the substrate 32 side surface and the surface opposite to it and cure the semi-cured cholesteric layer 23' while retaining this curing rate gradient, thereby simultaneously broadening the selective reflection wave ranges of the three patterns 26, 27 and 28 in the semi-cured cholesteric layer 23' (the wave-range-broadening step). To broaden the selective reflection wave ranges of the patterns formed in the semi-cured cholesteric layer 23', a method using oxygen or a method using weak active radiation can be adopted as in the above-described first embodiment.

Lastly, as shown in FIG. 2(f), the semi-cured cholesteric layer 23' having the broadened selective reflection wave ranges is cured by the application of active radiation 31 while retaining the cholesteric regularity which the semi-cured cholesteric layer 23' has developed in the course of broadening of its selective reflection wave rages, thereby obtaining a cured cholesteric layer 23'' (the step of forming a cured cholesteric layer). In this step, the radiant intensity of the active radiation 31 that is applied to the semi-cured cholesteric layer 23' is controlled enough to fully cure the semi-cured cholesteric layer 23'.

In the above-described method of producing a circular polarization controlling optical element according to the second embodiment of the present invention, the liquid crystal layer 23 having therein the semi-cured areas 23a, 23b and 23c in a plurality of patterns with different degrees of cure is brought into contact with a solvent, so that it is possible to obtain, at one time, the semi-cured cholesteric layer 23' having patterns corresponding to red (R), green (G) and blue (B) through the step of forming a semi-cured cholesteric layer shown in FIGS. 2(b), 2(c) and 2(d). It is therefore also possible, in the subsequent wave-range-broadening step, to simultaneously broaden the selective reflection wave ranges of the patterns 26, 27 and 28 corresponding to red (R), green (G) and blue (B), formed in the semi-cured cholesteric layer 23'. This is very advantageous from the viewpoint of production efficiency.

Each step of the aforementioned method of producing a circular polarization controlling optical element according to the second embodiment of the present invention will be described in detail hereinafter. The second embodiment of the invention is the same as the above-described first embodiment except the step of forming a semi-cured cholesteric layer, so that only this step will be described below, and explanations for the other steps are omitted.

(1. Step of Forming Semi-Cured Cholesteric Layer)

In the step of forming a semi-cured cholesteric layer according to the second embodiment of the present invention, active radiation 24 with different radiant intensities is applied pattern-wise, through a photomask 33, to the liquid crystal layer 23 to form therein semi-cured areas 23a, 23b and 23c in three patterns with different degrees of cure, as shown in FIG. 2(b). Namely, to those areas in the liquid crystal layer 23 that are intended to have selective reflection colors of red (R), green (G) and blue (B), active radiation 24 is applied while varying its radiant intensity, application time, etc. to form semi-cured areas 23a, 23b and 23c in three patterns with different degrees of cure. Next, as shown in FIG. 1(c), the liquid crystal layer 23 having the semi-cured areas 23a, 23b and 23c in three patterns with different degrees of cure is brought into contact with a solvent 25 to selectively dissolve away the uncured components of the liquid crystal layer 23, that is, the polymerizable chiral agent and the polymerizable liquid crystalline material capable of developing nematic regularity. As a result, the ratio of the polymerizable chiral agent to the polymerizable liquid crystalline material in each semi-cured area 23a, 23b, 23c formed in the liquid crystal layer 23 varies according to the degree of cure of the semi-cured area. Thus, a semi-cured cholesteric layer 23' having therein three patterns 26, 27 and 28 of different selective reflection colors is obtained as shown in FIG. 1(d).

The reason why the semi-cured cholesteric layer 23' having the three patterns 26, 27 and 28 of different selective reflection colors can be obtained in the above-described manner is as follows. The liquid crystalline composition comprises, as main components, a polymerizable chiral agent and a polymerizable liquid crystalline material capable of developing nematic regularity. A solvent dissolves away these two components from the semi-cured areas 23a, 23b and 23c with different degrees of cure, formed in the liquid crystal layer 23. However, if the solvent used is of the type that the compatibility with the polymerizable chiral agent is greatly different from that with the polymerizable liquid crystalline material, the two components are dissolved away at different rates. Therefore, the uncured components are dissolved away to the extents that are different depending upon the degree of cure in the semi-cured cholesteric layer, and, as a result, the composition of the liquid crystalline composition varies. For this reason, if the degree of cure and that of dissolution are controlled beforehand so that each area reflects light of red (R), green (G) or blue (B), it becomes possible to form, in one semi-cured cholesteric layer 23', three patterns 26, 27 and 28 that respectively reflect light of red (R), green (G) and blue (B).

Detailed explanations for the active radiation 24 and solvent 25 to be used in the above-described step of forming a semi-cured cholesteric layer will be given below.

(1.1. Active Radiation)

The same active radiation as the active radiation 4 to be used in the step of forming a semi-cured cholesteric layer in the aforementioned first embodiment can be used as the active radiation 24 in the step of forming a semi-cured cholesteric layer in the second embodiment of the present invention.

In the second embodiment of the invention, however, it is necessary to form, in the liquid crystal layer 23, the semi-cured areas 23a, 23b and 23c in three patterns with different degrees of cure, so that the active radiation is applied to those areas in the liquid crystal layer that are intended to have the selective reflection colors of red (R), green (G) and blue (B), while varying radiant intensity, application time, and so forth.

The radiant intensity of the active radiation 24 cannot be sweepingly specified because it varies depending also on the contents of the liquid crystalline composition. In general, however, the radiant intensity is controlled within a range between 0.00mW/cm$^2$ and 1000mW/cm$^2$ (between 0.01mJ/cm$^2$ and 10000 mJ/cm$^2$, if expressed in irradiation quantity) to create those areas capable of reflecting light of red (R), green (G) and blue (B).

Other details of the active radiation 24 are all the same as those of the active radiation 4 to be used in the step of forming a semi-cured cholesteric layer in the above-described first embodiment, so that they are not presented here any more.

(1.2. Solvent)

Any solvent can be used as the solvent 25 to be used in the step of forming a semi-cured cholesteric layer in the second embodiment of the present invention as long as it can selectively dissolve away the polymerizable chiral agent and the polymerizable liquid crystalline material capable of developing nematic regularity, which are the uncured components of the liquid crystal layer 23 having the semi-cured areas 23a, 23b and 23c in three patterns with different degrees of cure, and as long as it does not dissolve the surface of the substrate 32 (the alignment layer 22 formed on the base 21, or the like).

Specifically, it is possible to use as the solvent 25 one of, or two or more of the following solvents: hydrocarbons such as benzene, toluene, xylene, n-butyl benzene, diethyl benzene and tetralin; ethers such as methoxybenzene, 1,2-dimethoxybenzene and diethylene glycol dimethyl ether; ketones such as acetone, methyl ethyl ketone, methyl isobutyl ketone, cyclohexanone and 2,4-pentandione; esters such as ethyl acetate, ethylene glycol monomethyl ether acetate, propylene glycol monomethyl ether acetate, propylene glycol monoethyl ether acetate and y-butyrolactone; amides such as 2-pyrrolidone, N-methyl-2-pyrrolidone, dimethylformamide and dimethylacetamide; halogen-containing solvents such as chloroform, dichloromethane, carbon tetrachloride, dichloroethane, tetrachloroethane, trichloroethylene, tetrachloroethylene, chlorobenzene and orthodichlorobenzene; alcohols such as t-butyl alcohol, diacetone alcohol, glycerin, monoacetin, ethylene glycol, triethylene glycol, hexylene glycol, ethylene glycol monomethyl ether, ethyl cellosolve and butyl cellosolve; and phenols such as phenol and parachlorophenol.

To bring the liquid crystal layer 23 into contact with the above solvent 25, one of various development techniques, such as dipping or spin showering, may be used.

(2. Others)

In the second embodiment of the present invention, the wave-range-broadening step is conducted after the above-described step of forming a semi-cured cholesteric layer. With this wave-range-broadening step, it is possible to simultaneously broaden the selective reflection wave ranges of all of the patterns 26, 27 and 28 formed in the semi-cured cholesteric layer 23'. Alternatively, only the selective reflection wave range corresponding to the desired selective reflection color may be broadened by applying, in the wave-range-broadening step, active radiation 29 through a photomask or the like only to the pattern of the desired selective reflection color, formed in the semi-cured cholesteric layer 23'.

Further, the multi-layering and multi-coloring of the cured cholesteric layer as described above in connection with the first embodiment may be conducted also in the second embodiment of the present invention. The details of these processes are the same as those in the above-described first embodiment, so that explanations for them are omitted.

EXAMPLE

The above-described embodiments of the invention will now be explained more specifically by referring to the following example.

(Formation of Cured Cholesteric Layer Having Broadened Selective Reflection Wave Range, Reflecting Red Light)

A photo-curing chiral nematic liquid crystal consisting of a polymerizable nematic liquid crystal (96 parts by weight), a polymerizable chiral agent (3 parts by weight) and a photopolymerization initiator (1 part by weight) was dissolved in toluene to obtain a 25-wt. % toluene solution.

The nematic liquid crystal used was a liquid crystal composed of a compound represented by the following chemical formula (5) and a compound represented by the chemical formula (6) at a weight ratio of 50:50:

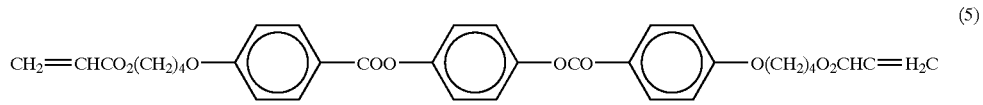

(5)

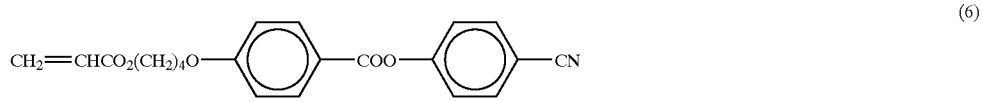

(6)

The polymerizable chiral agent used was a compound represented by the following chemical formula (7):

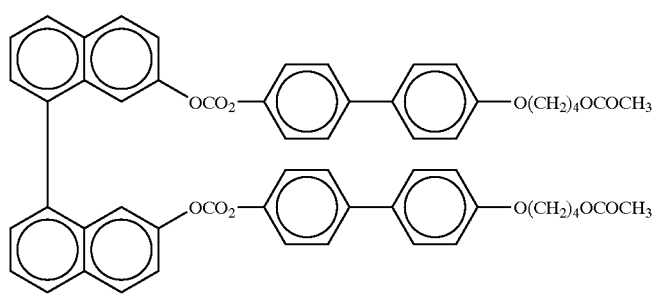

(7)

The photopolymerization initiator used was Irg 369 available from Ciba Specialty Chemicals, K.K., Japan.

On the other hand, a glass substrate was spin-coated with polyimide (PI), and the polyimide layer formed was rubbed in one direction to obtain a polyimide (PI) alignment layer with a thickness of 1000 angstroms.

The glass substrate (alignment substrate) coated with polyimide (PI), subjected to rubbing treatment, was set in a spin coater and was spin-coated with the above-prepared toluene solution so that the resulting layer had a thickness of approximately 4.5 $\mu$m.

Subsequently, drying of the layer thus formed and aligning treatment were conducted by heating at 80° C. for 5 minutes. It was then visually confirmed that the liquid crystal layer formed on the alignment substrate was a cholesteric layer reflecting red light, having a selective reflection wave range with a central wavelength of 630 nm.

By the use of an ultraviolet light generator using an extra-high-pressure mercury vapor lamp, ultraviolet light of 365 nm was applied in a quantity of 5 mJ/cm$^2$ to the above liquid crystal layer through a photomask with a predetermined pattern (consisting of two stripe-shaped areas with transmittances of 100% and 0%, arranged with pitches of 100 $\mu$m and 200 $\mu$m, respectively), thereby polymerizing the liquid crystal layer to form a semi-cured cholesteric layer on the alignment substrate.

Thereafter, the semi-cured cholesteric layer formed on the alignment substrate was immersed in acetone for 5 minutes, and was then dried by heating at 60° C. for 15 minutes to obtain a semi-cured cholesteric layer in the shape of a stripe with a width of 100 $\mu$m. At this point, the reflectance of this stripe of the semi-cured cholesteric layer formed on the alignment substrate was measured by a microspectrophotometer. As a result, the half width (A) was found to be approximately 64 nm.

The alignment substrate on which the semi-cured cholesteric layer had been formed in the above-described manner was placed on a hot plate at 80° C., and ultraviolet light of 365 nm with a radiant intensity of 0.2 mW/cm$^2$ was applied to this layer for 180 seconds in an atmosphere of nitrogen by the use of an ultraviolet light generator using an extra-high-pressure mercury vapor lamp. At this point, the reflectance of the semi-cured cholesteric layer on the alignment substrate was measured by a microspectrophotometer. As a result, the half width ($\Delta\lambda$) was found to be approximately 95 nm.

Thereafter, ultraviolet light of 365 nm with a radiant intensity of 10 mW/cm$^2$ was further applied to the semi-cured cholesteric layer for 60 seconds in an atmosphere of nitrogen by the use of an ultraviolet light generator using an extra-high-pressure mercury vapor lamp to stabilize the optical properties of the cholesteric layer.

(Formation of Cholesteric Layer Having Broadened Selective Reflection Wave Range, Reflecting Green Light)

A photo-curing chiral nematic liquid crystal consisting of a polymerizable nematic liquid crystal (94.5 parts by weight), a polymerizable chiral agent (4.5 parts by weight)

and a photopolymerization initiator (1 part by weight) was dissolved in toluene to obtain a 25-wt. % toluene solution.

The nematic liquid crystal used was a liquid crystal composed of a compound represented by the following chemical formula (5) and a compound represented by the chemical formula (6) at a weight ratio of 50:50:

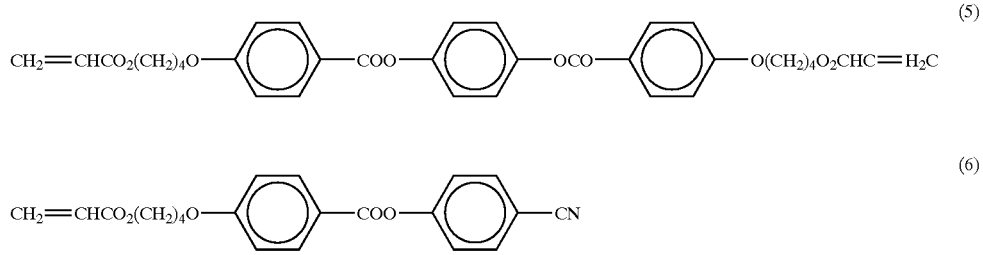

The polymerizable chiral agent used was a compound represented by the following chemical formula (7):

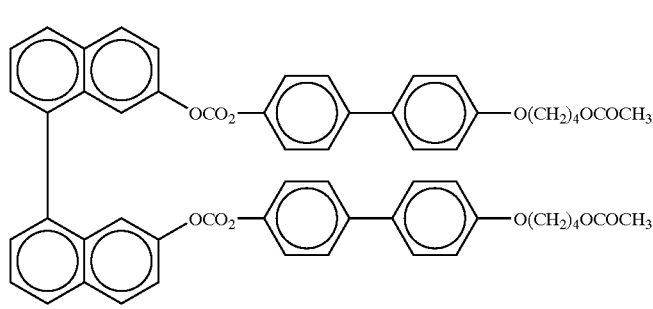

The photopolymerization initiator used was Irg 369 available from Ciba Specialty Chemicals, K.K., Japan.

The alignment substrate having thereon the previously-formed cured cholesteric layer of red color was set in a spin coater, and was spin-coated with the above-prepared toluene solution so that the resulting layer had a thickness of approximately 4.5 μm.

Subsequently, drying of the layer thus formed and aligning treatment were conducted by heating at 80° C. for 5 minutes. It was then visually confirmed that the liquid crystal layer formed on the alignment substrate was a cholesteric layer reflecting green light, having a selective reflection wave range with a central wavelength of 550 nm.

Next, after moving the above-described photomask 100 μm in the lateral direction to shift its position relative to the liquid crystal layer by just one stripe, ultraviolet light of 365 nm was applied in a quantity of 5 mJ/cm² to the liquid crystal layer through this photomask by the use of an ultraviolet light generator using an extra-high-pressure mercury vapor lamp, thereby polymerizing the liquid crystal layer to form a semi-cured cholesteric layer on the alignment substrate.

Thereafter, the semi-cured cholesteric layer formed on the alignment substrate was immersed in acetone for 5 minutes, and was then dried by heating at 60° C. for 15 minutes to form a semi-cured cholesteric layer in the shape of a stripe with a width of 100 μm. At this point, the reflectance of the stripe of the semi-cured cholesteric layer formed on the alignment substrate was measured by a microspectrophotometer. As a result, the half width (Δλ) was found to be approximately 60 nm.

The alignment substrate on which the semi-cured cholesteric layer had been formed in the above-described manner was placed on a hot plate at 80° C., and ultraviolet light of 365 nm with a radiant intensity of 0.2 mW/cm² was applied to this layer for 180 seconds in an atmosphere of nitrogen by the use of an ultraviolet light generator using an extra-high-pressure mercury vapor lamp. At this point, the reflectance of the semi-cured cholesteric layer on the alignment substrate was measured by a microspectrophotometer. As a result, the half width (Δλ) was found to be approximately 90 nm.

Thereafter, ultraviolet light of 365 nm with a radiant intensity of 10 mW/cm² was further applied to the semi-cured cholesteric layer for 60 seconds in an atmosphere of nitrogen by the use of an ultraviolet light generator using an extra-high-pressure mercury vapor lamp to stabilize the optical properties of the cholesteric layer.

(Formation of Cured Cholesteric Layer Having Broadened Selective Reflection Wave Range, Reflecting Blue Light)

A photo-curing chiral nematic liquid crystal consisting of a polymerizable nematic liquid crystal (93 parts by weight), a polymerizable chiral agent (6 parts by weight) and a photopolymerization initiator (1 part by weight) was dissolved in toluene to obtain a 25-wt. % toluene solution.

The nematic liquid crystal used was a liquid crystal composed of a compound represented by the following chemical formula (5) and a compound represented by the chemical formula (6) at a weight ratio of 50:50:

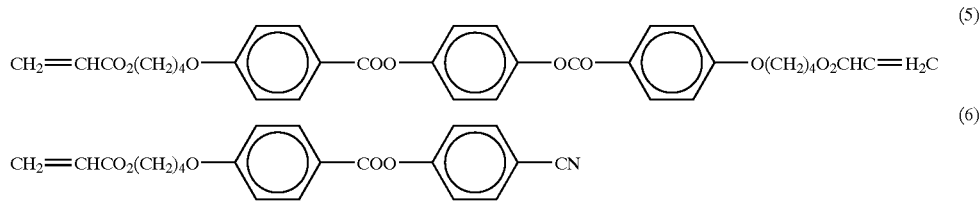

(5)

(6)

The polymerizable chiral agent used was a compound represented by the following chemical formula (7):

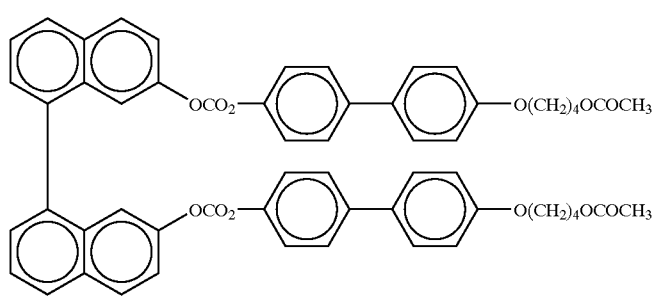

(7)

The photopolymerization initiator used was Irg 369 available from Ciba Specialty Chemicals, K.K., Japan.

The alignment substrate having thereon the cured cholesteric layers of red and green colors formed previously was set in a spin coater, and was spin-coated with the above-prepared toluene solution so that the resulting layer had a thickness of approximately 4.5 μm.

Subsequently, drying of the layer thus formed and aligning treatment were conducted by heating at 80° C. for 5 minutes. It was then visually confirmed that the liquid crystal layer formed on the alignment substrate was a cholesteric layer reflecting blue light, having a selective reflection wave range with a central wavelength of 480 nm.

Next, after moving the above-described photomask 100 μm in the lateral direction to shift its position relative to the liquid crystal layer by just one stripe, ultraviolet light of 365 nm was applied in a quantity of 5 mJ/cm² to the liquid crystal layer through this photomask by the use of an ultraviolet light generator using an extra-high-pressure mercury vapor lamp, thereby polymerizing the liquid crystal layer to form a semi-cured cholesteric layer on the alignment substrate.

Thereafter, the semi-cured cholesteric layer formed on the alignment substrate was immersed in acetone for 5 minutes, and was then dried by heating at 60° C. for 15 minutes to form a semi-cured cholesteric layer in the shape of a stripe with a width of 100 μm. At this point, the reflectance of the stripe of the semi-cured cholesteric layer formed on the alignment substrate was measured by a microspectrophotometer. As a result, the half width (Δλ) was found to be approximately 45 nm.

The alignment substrate on which the semi-cured cholesteric layer had been formed in the above-described manner was placed on a hot plate at 80° C., and ultraviolet light of 365 nm with a radiant intensity of 0.2 mW/cm² was applied to this layer for 180 seconds in an atmosphere of nitrogen by the use of an ultraviolet light generator using an extra-high-pressure mercury vapor lamp. At this point, the reflectance of the semi-cured cholesteric layer on the alignment substrate was measured by a microspectrophotometer. As a result, the half width (Δλ) was found to be approximately 70 nm.

Thereafter, ultraviolet light of 365 nm with a radiant intensity of 10 mW/cm² was further applied to the semi-cured cholesteric layer for 60 seconds in an atmosphere of nitrogen by the use of an ultraviolet light generator using an extra-high-pressure mercury vapor lamp to stabilize the optical properties of the cholesteric layer.

There was thus finally obtained a color filter in which the cured cholesteric layers of three colors, having broadened selective reflection wave ranges, were arranged on the alignment substrate.

The present invention is not limited to the above-described embodiments and example, which are herein given for illustration only. The invention is susceptible to a great variety of modifications without departing from the spirit of the disclosure and the scope of the appended claims.

The invention claimed is:

1. A method of producing a circular polarization controlling optical element, the method comprising:
   a liquid-crystal-layer-forming step of forming, on a substrate having aligning power, an active-radiation-curing liquid crystal layer having cholesteric regularity, the liquid crystal layer containing a polymerizable chiral agent and a polymerizable liquid crystalline material capable of developing nematic regularity;
   a semi-cured-cholesteric-layer-forming step of forming a semi-cured cholesteric layer by applying active radiation with a predetermined radiant intensity to the liquid crystal layer; and
   a wave-range-broadening step of broadening a selective reflection wave range of the semi-cured cholesteric layer by curing the semi-cured cholesteric layer with a curing rate gradient being formed in the semi-cured cholesteric layer between a substrate-side surface and a surface opposite to the substrate-side surface.

2. The method according to claim 1, further comprising a cured-cholesteric-layer-forming step of forming a cured cholesteric layer by curing the semi-cured cholesteric layer having the broadened selective reflection wave range.

3. The method according to claim 2, wherein the semi-cured cholesteric layer contains an oxygen-dependent polymerization initiator; and, in the wave-range-broadening step, active radiation with a radiant intensity lower than that of active radiation to be used in the cured-cholesteric-layer-forming step is applied to the semi-cured cholesteric layer while exposing one surface thereof to an atmosphere of oxygen that acts to hinder the curing of the semi-cured cholesteric layer.

4. The method according to claim 3, wherein the active radiation to be used in the wave-range-broadening step is ultraviolet light; and the oxygen-dependent polymerization initiator is a photopolymerization initiator.

5. The method according to claim 3, wherein the atmosphere of oxygen, in which the wave-range-broadening step is effected, contains 10% or more of oxygen.

6. The method according to claim 5, wherein the atmosphere of oxygen is that of air.

7. The method according to claim 2, wherein in the wave-range-broadening step, weak active radiation with a radiant intensity of 0.1 to 10% of that of active radiation to be used in the cured-cholesteric-layer-forming step is applied only to one surface of the semi-cured cholesteric layer.

8. The method according to claim 7, wherein the application of the weak active radiation in the wave-range-broadening step is conducted in an oxygen-free atmosphere.

9. The method according to claim 7, wherein the active radiation to be used in the wave-range-broadening step is ultraviolet light and the semi-cured cholesteric layer contains a photopolymerization initiator.

10. The method according to claim 7, wherein the semi-cured cholesteric layer contains an oxygen-dependent photopolymerization initiator; and the application of the weak active radiation in the wave-range-broadening step is conducted while exposing, to an atmosphere of oxygen, only a surface of the semi-cured cholesteric layer opposite to the surface to be applied with the weak active radiation.

11. The method according to claim 10, wherein the active radiation to be used in the wave-range-broadening step is ultraviolet light.

12. The method according to claim 1, wherein the semi-cured cholesteric layer formed in the semi-cured-cholesteric-layer-forming step is in such a state that functional groups in an amount of 10 to 80 mol % of the total functional groups contained in the polymerizable chiral agent and the polymerizable liquid crystalline material capable of developing nematic regularity have been polymerized.

13. The method according to claim 1, wherein the substrate, on which the liquid crystal layer is formed in the a liquid-crystal-layer-forming step, includes a base having aligning power on the surface thereof.

14. The method according to claim 1, wherein the substrate, on which the liquid crystal layer is formed in the liquid-crystal-layer-forming step, includes a base and an alignment layer formed on the base and having aligning power.

15. The method according to claim 1, wherein the semi-cured-cholesteric-layer-forming step comprises a step of applying pattern-wise, to the liquid crystal layer formed on the substrate, active radiation with a predetermined radiant intensity so as to form, in the liquid crystal layer, a semi-cured area in a predetermined pattern; and a step of developing the liquid crystal layer having the semi-cured area in the predetermined pattern, thereby obtaining a semi-cured cholesteric layer having the predetermined pattern.

16. The method according to claim 1, wherein the semi-cured-cholesteric-layer-forming step comprises: a step of applying pattern-wise, to the liquid crystal layer formed on the substrate, active radiation with different radiant intensities so as to form, in the liquid crystal layer, semi-cured areas in a plurality of patterns with different degrees of cure; and a step of bringing the liquid crystal layer having therein the semi-cured areas in a plurality of patterns with different degrees of cure into contact with a solvent that can selectively dissolve away uncured components of the liquid crystal layer, that is, the polymerizable chiral agent and the polymerizable liquid crystalline material capable of developing nematic regularity, thereby obtaining a semi-cured cholesteric layer having a plurality of patterns of different selective reflection colors.

17. The method according to claim 1, wherein in the wave-range-broadening step, the semi-cured cholesteric layer is cured with the semi-cured cholesteric layer being heated.

18. The method according to claim 1, in which a circular polarization controlling optical element is produced by forming two or more cured cholesteric layers by repeatedly conducting the liquid-crystal-layer-forming step, the semi-cured-cholesteric-layer-forming step and the wave-range-broadening step after forming a first semi-cured cholesteric layer, wherein in the liquid-crystal-layer-forming step for a second or later liquid crystal layer, an alignment layer is formed on the first semi-cured cholesteric layer that has already been formed, and on this alignment layer is formed an active-radiation-curing liquid crystal layer having cholesteric regularity, which contains a polymerizable chiral agent and a polymerizable liquid crystalline material capable of developing nematic regularity.

19. The method according to claim 1, in which a circular polarization controlling optical element is produced by forming two or more cured cholesteric layers by repeatedly conducting the liquid-crystal-layer-forming step, the semi-cured-cholesteric-layer-forming step and the wave-range-broadening step after forming a first semi-cured cholesteric layer, wherein in the liquid-crystal-layer-forming step for a second or later liquid crystal layer, an active-radiation-curing liquid crystal layer having cholesteric regularity, which contains a polymerizable chiral agent and a polymerizable liquid crystalline material capable of developing nematic regularity, is formed directly on the first semi-cured cholesteric layer that has already been formed.

20. A method of producing a circular polarization controlling optical element, the method comprising:

a liquid-crystal-layer-forming step of forming, on a substrate having aligning power, an active-radiation-curing liquid crystal layer having cholesteric regularity, the liquid crystal layer containing a chiral agent and a polymerizable liquid crystalline material capable of developing nematic regularity;

a semi-cured-area-forming step of forming a semi-cured area in the liquid crystal layer by applying active radiation with a predetermined radiant intensity to the liquid crystal layer;

a semi-cured-cholesteric-layer-forming step of bringing the liquid crystal layer having therein the semi-cured area into contact with a solvent that can selectively dissolve away uncured components of the liquid crystal layer, that is, the chiral agent and the polymerizable liquid crystalline material capable of developing nematic regularity, thereby obtaining a semi-cured cholesteric layer of a predetermined selective reflection color; and a wave-range-broadening step of broadening a selective reflection wave range of the semi-cured cholesteric layer by curing the semi-cured cholesteric layer with a curing rate gradient being formed in the semi-cured cholesteric layer between a substrate-side surface and a surface opposite to the substrate-side surface.

21. The method according to claim 20, further comprising a cured-cholesteric-layer-forming step of forming a cured cholesteric layer by curing the semi-cured cholesteric layer.

22. The method according to claim 20, wherein in the semi-cured-area-forming-step, active radiation with different radiant intensities is applied pattern-wise to the liquid crystal layer to form therein semi-cured areas in a plurality of patterns with different degrees of cure; and in the semi-cured-cholesteric-layer-forming step, the liquid crystal layer having therein the semi-cured areas in a plurality of patterns with different degrees of cure is brought into contact with a solvent that can selectively dissolve away uncured components of the liquid crystal layer, that is, the chiral agent and the polymerizable liquid crystalline material capable of developing nematic regularity, thereby obtaining a semi-cured cholesteric layer having a plurality of patterns of different selective reflection colors.

23. The method according to claim 20, wherein the substrate, on which the liquid crystal layer is formed in the liquid-crystal-layer-forming step, includes a base having aligning power on the surface thereof.

24. The method according to claim 20, wherein the substrate, on which the liquid crystal layer is formed in the liquid-crystal-layer-forming step, includes a base and an alignment layer formed on the base and having aligning power.

* * * * *